United States Patent
Di Girolamo et al.

(10) Patent No.: US 12,167,500 B2
(45) Date of Patent: Dec. 10, 2024

(54) METHODS TO LEVERAGE NON-CELLULAR DEVICE CAPABILITIES

(71) Applicant: InterDigital Patent Holdings, Inc., Wilmington, DE (US)

(72) Inventors: Rocco Di Girolamo, Laval (CA); Catalina Mihaela Mladin, Hatboro, PA (US); Hongkun Li, Malvern, PA (US); Michael F. Starsinic, Newtown, PA (US); Quang Ly, North Wales, PA (US); Dale N. Seed, Allentown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 519 days.

(21) Appl. No.: 17/295,589

(22) PCT Filed: Nov. 21, 2019

(86) PCT No.: PCT/US2019/062567
§ 371 (c)(1),
(2) Date: May 20, 2021

(87) PCT Pub. No.: WO2020/112480
PCT Pub. Date: Jun. 4, 2020

(65) Prior Publication Data
US 2022/0022029 A1    Jan. 20, 2022

Related U.S. Application Data

(60) Provisional application No. 62/772,258, filed on Nov. 28, 2018.

(51) Int. Cl.
*H04W 4/50* (2018.01)
*H04L 67/00* (2022.01)
(Continued)

(52) U.S. Cl.
CPC ............... *H04W 8/24* (2013.01); *H04L 67/34* (2013.01); *H04L 67/51* (2022.05); *H04W 4/50* (2018.02); *H04W 60/00* (2013.01)

(58) Field of Classification Search
CPC ......... H04W 8/24; H04W 4/50; H04W 60/00; H04L 67/34; H04L 67/51
(Continued)

(56) References Cited

U.S. PATENT DOCUMENTS

| 2015/0256861 A1* | 9/2015 | Oyman ............... H04N 21/6582 725/62 |
| 2016/0057724 A1* | 2/2016 | Horn .................... H04W 60/005 455/435.1 |

(Continued)

FOREIGN PATENT DOCUMENTS

| EP | 3148290 A1 | 3/2017 |
| WO | 2016/109578 A1 | 7/2016 |

*Primary Examiner* — Hirdepal Singh
(74) *Attorney, Agent, or Firm* — Flaster Greenberg P.C.

(57) ABSTRACT

Cellular devices are becoming more and more powerful, and may host a number of different non-cellular capabilities, such as cameras, accelerometers, and sensors. Today, these capabilities are used mainly to provide some service to the device or the device owner. Disclosed herein are methods and systems for enabling devices to register their device capabilities with a cellular network, providing a mechanism for Application Servers to discover non-cellular capabilities of the devices, providing a mechanism to have the Application Servers configure these non-cellular capabilities of the devices, and preparing the device and the network for cellular traffic generated as a result of the Application Server using these non-cellular capabilities.

20 Claims, 24 Drawing Sheets

(51) Int. Cl.
*H04L 67/51* (2022.01)
*H04W 8/24* (2009.01)
*H04W 60/00* (2009.01)

(58) Field of Classification Search
USPC .................................................... 455/435.1
See application file for complete search history.

(56) References Cited

U.S. PATENT DOCUMENTS

2018/0004159 A1   1/2018  Farine et al.
2018/0041591 A1*  2/2018  Yoden ................. H04L 12/2814
2020/0280888 A1*  9/2020  Xu ...................... H04L 41/0893

* cited by examiner

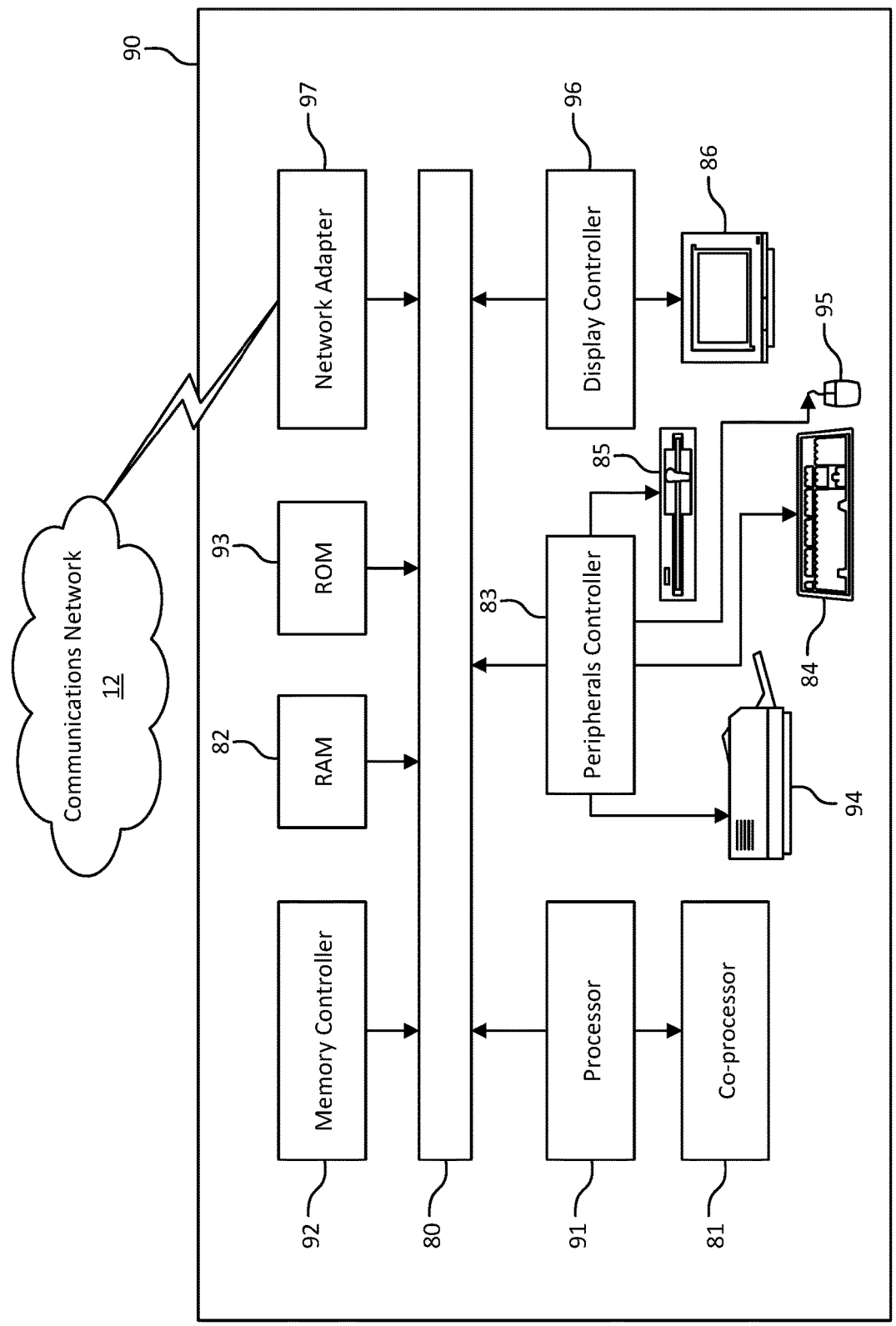

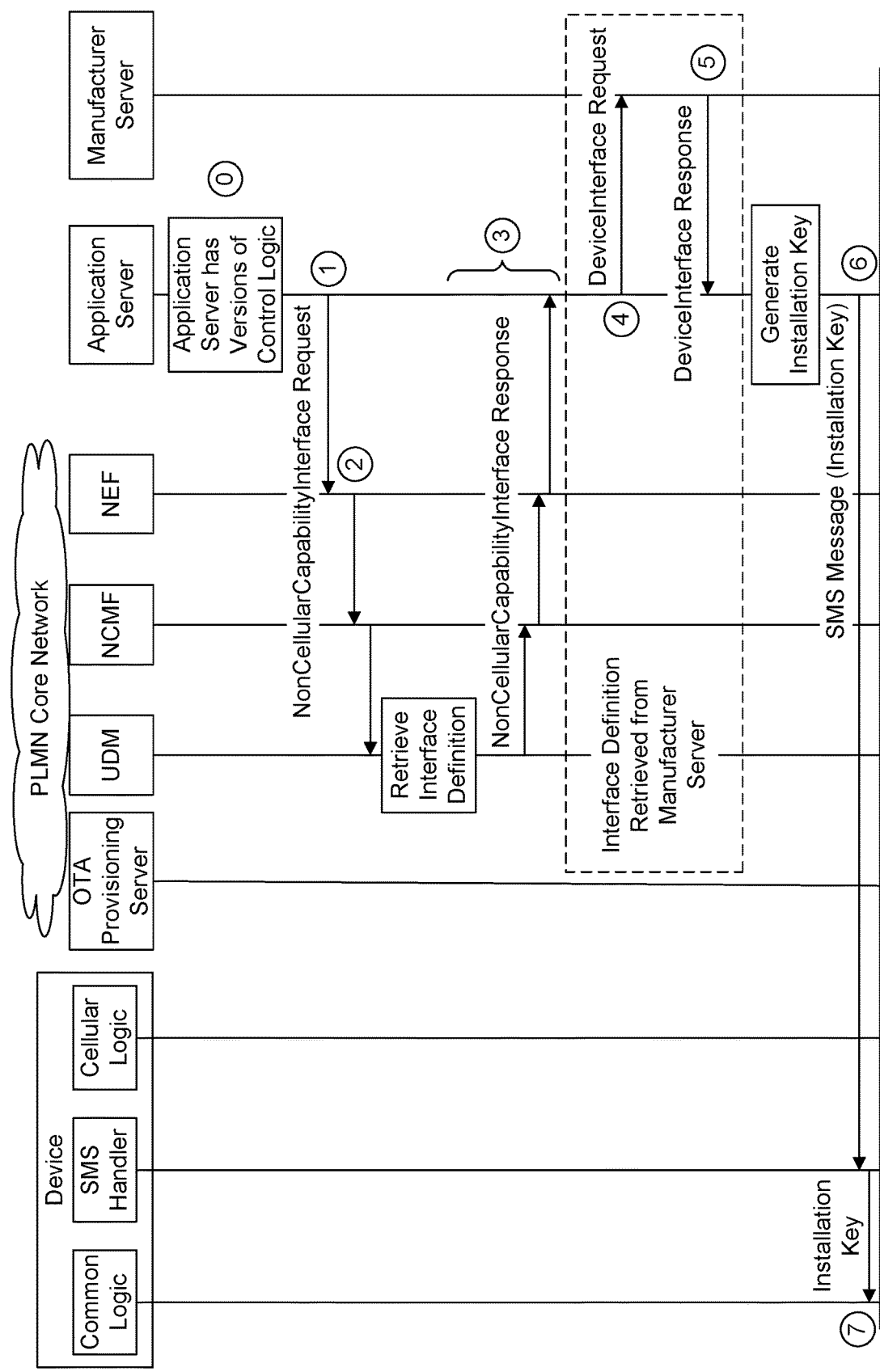

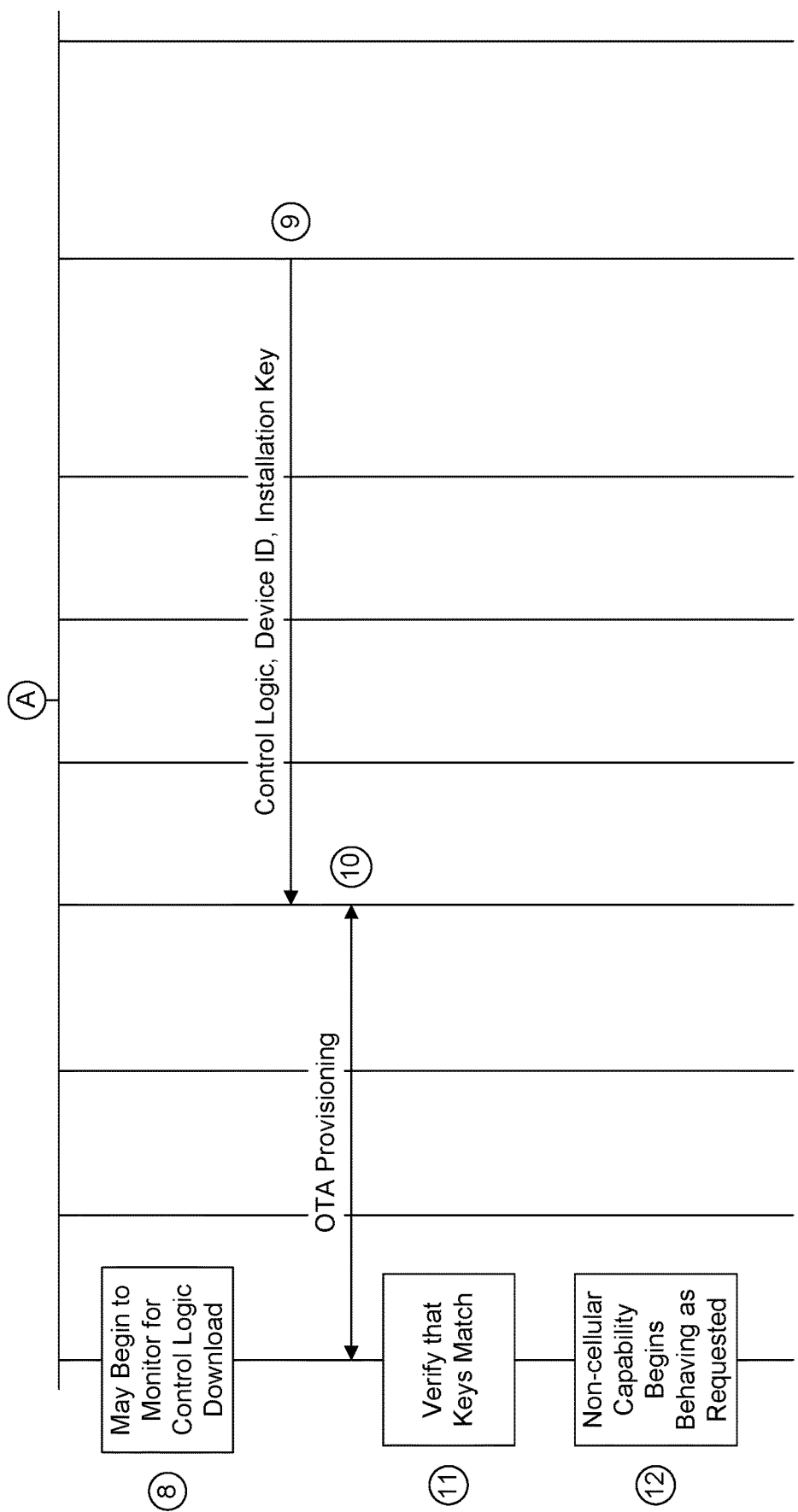

METHODS TO LEVERAGE NON-CELLULAR DEVICE CAPABILITIES

CROSS-REFERENCE TO RELATED APPLICATIONS

This application is the National Stage Application of International Patent Application No. PCT/US2019/062567 filed Nov. 21, 2019 which claims the benefit of U.S. Provisional Application No. 62/772,258, filed Nov. 28, 2018, titled "Methods to Leverage Non-Cellular Device Capabilities," the contents of which are hereby incorporated by reference in their entireties.

BACKGROUND

A user equipment (UE) may host a number of capabilities. These capabilities may be divided into cellular capabilities and non-cellular capabilities. The cellular capabilities may be those related to the 3GPP communication capabilities of the user equipment. There are two example types of cellular capabilities. UE Radio Capabilities may contain information on RATs that the UE supports, such as power class and frequency bands, while UE Core Network Capabilities may contain information on non radio-related capabilities, such as NAS security algorithms. Non-Cellular capabilities may refer to all other capabilities of the user equipment. For example, this can be related to the capability of the user equipment to take still pictures and video, sense temperature and pressure, determine GPS location, and to communicate over WiFi.

SUMMARY

Cellular devices are becoming more and more powerful, and may host a number of different non-cellular capabilities, such as cameras, accelerometers, and sensors. Today, these capabilities are used mainly to provide some service to the device or the device owner. Disclosed herein are methods and systems for enabling devices to register their device capabilities with a cellular network, providing a mechanism for Application Servers to discover non-cellular capabilities of the devices, providing a mechanism to have the Application Servers configure these non-cellular capabilities of the devices, and preparing the device and the network for cellular traffic generated as a result of the Application Server using these non-cellular capabilities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 1G is a block diagram of an exemplary computing system;

FIG. 9 shows a flow chart of an example method for non-cellular capability configuration where the device has no control logic;

DETAILED DESCRIPTION OF ILLUSTRATIVE EMBODIMENTS

Example Communication System and Networks

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 1A:
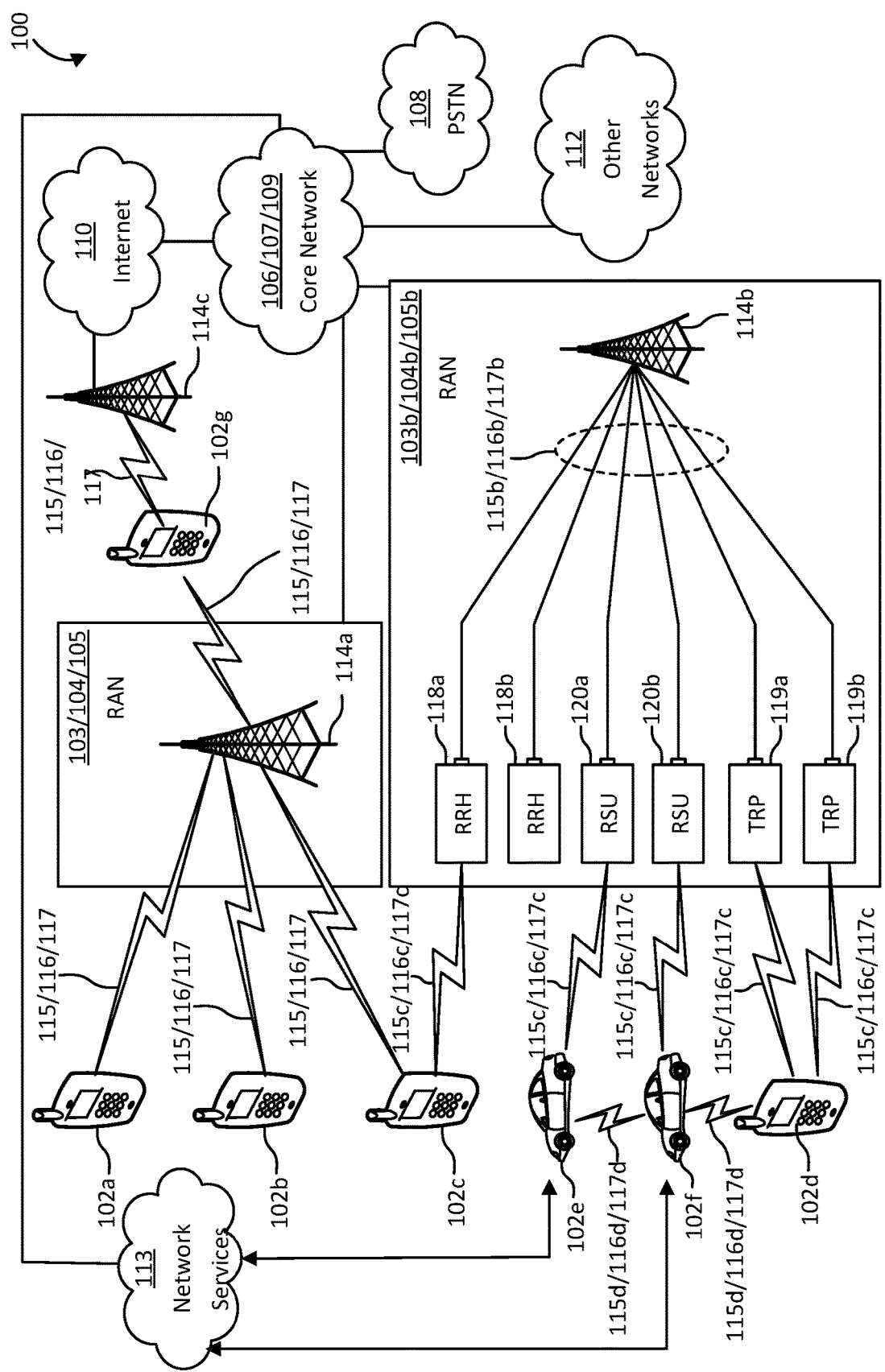
FIG. 1A illustrates an example communications system.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway maybe a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
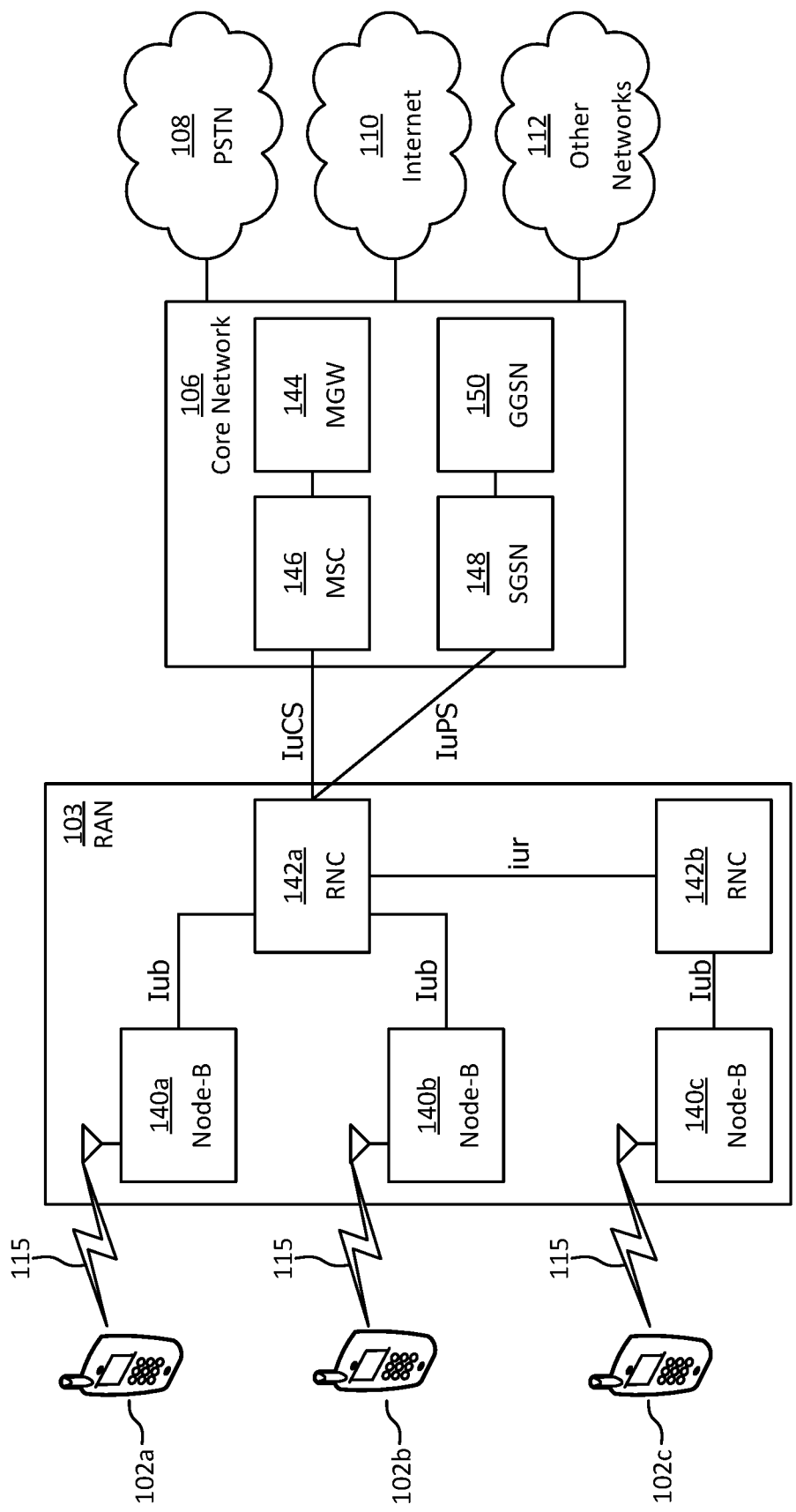
FIGS. 1B, 1C, and 1D are system diagrams of example RANs and core networks.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
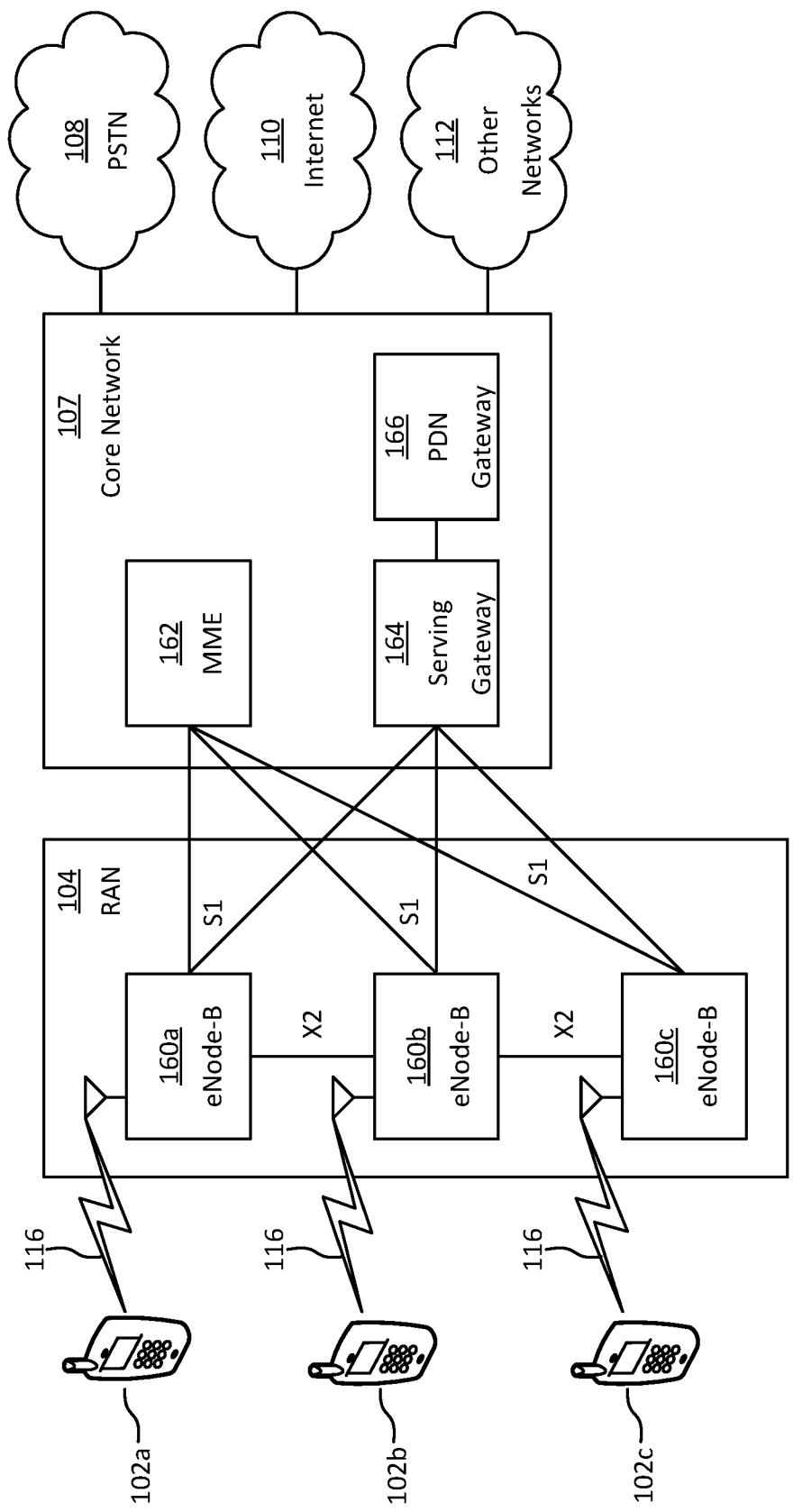

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
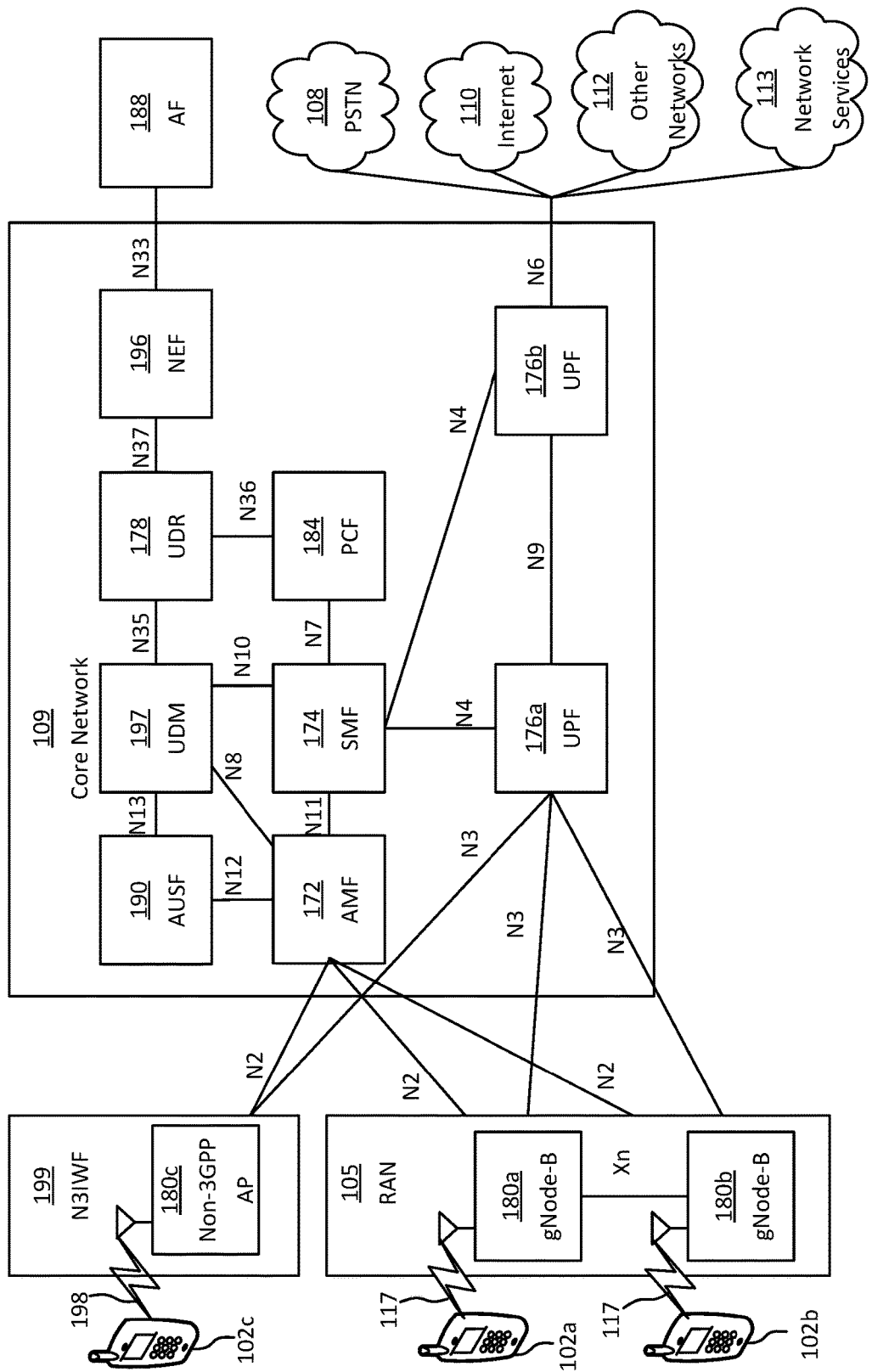

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in Figure x1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
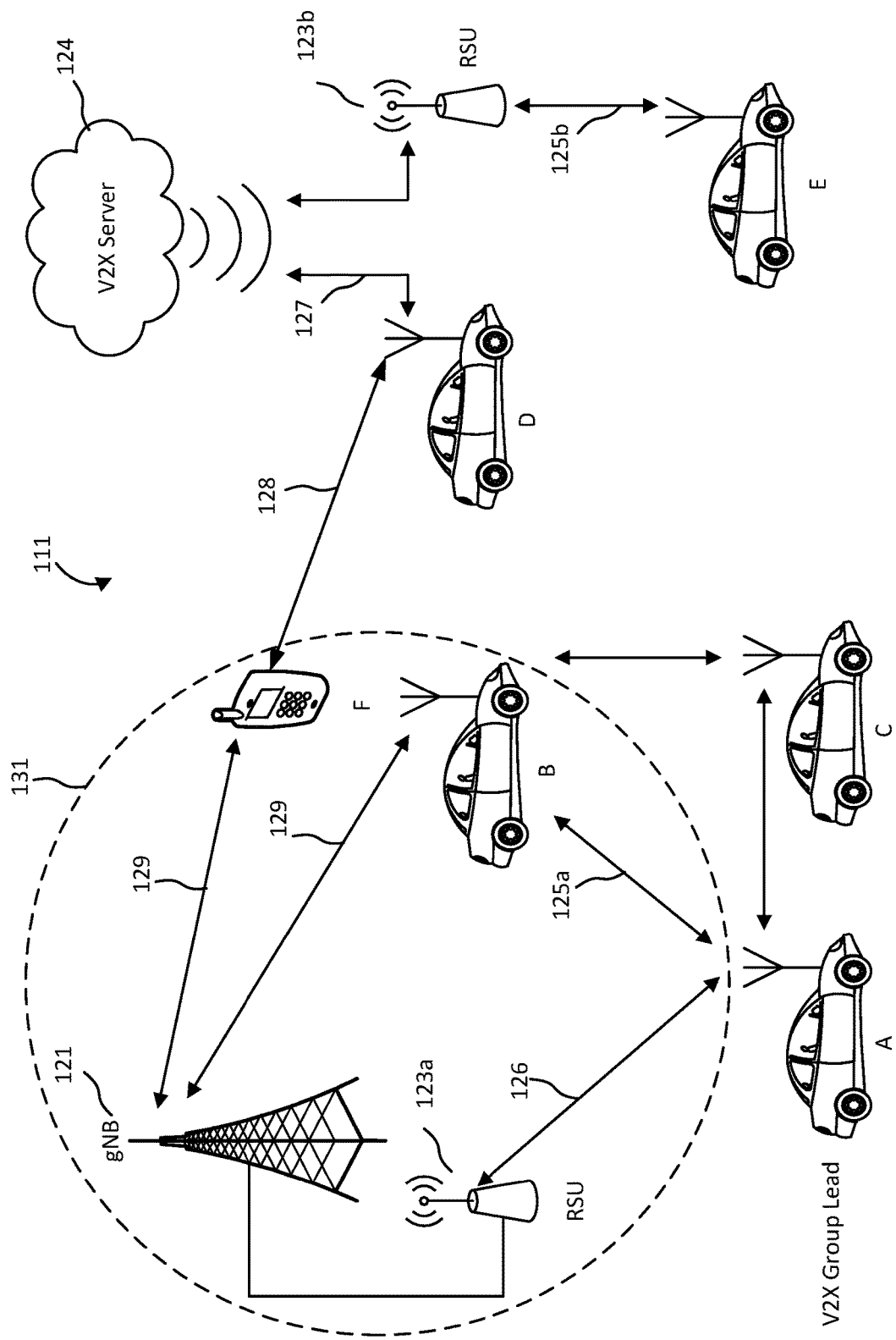
FIG. 1E illustrates another example communications system.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
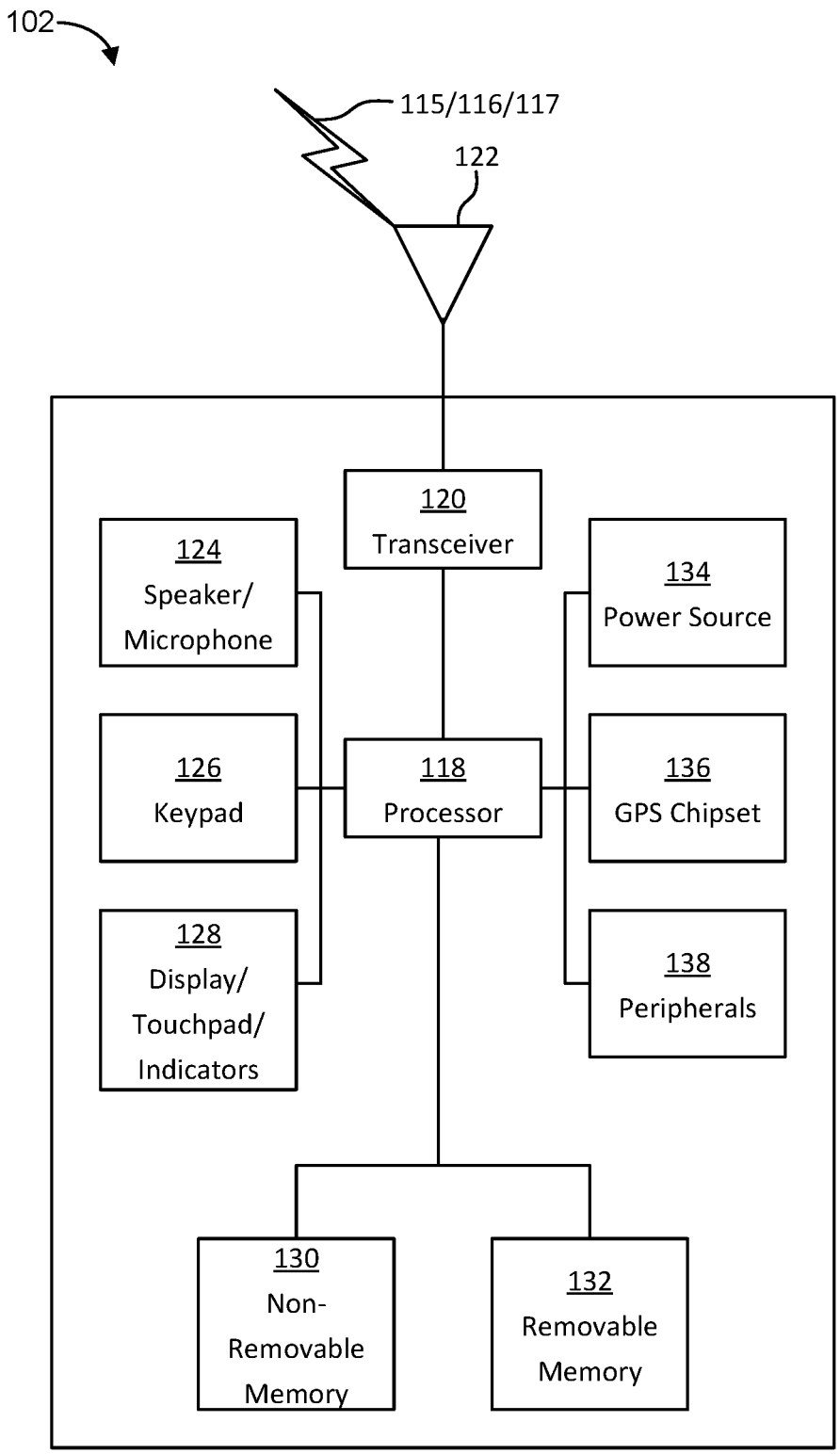
FIG. 1F is a block diagram of an example apparatus or device, such as a WTRU.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

DETAILED DESCRIPTION

Figure 2:
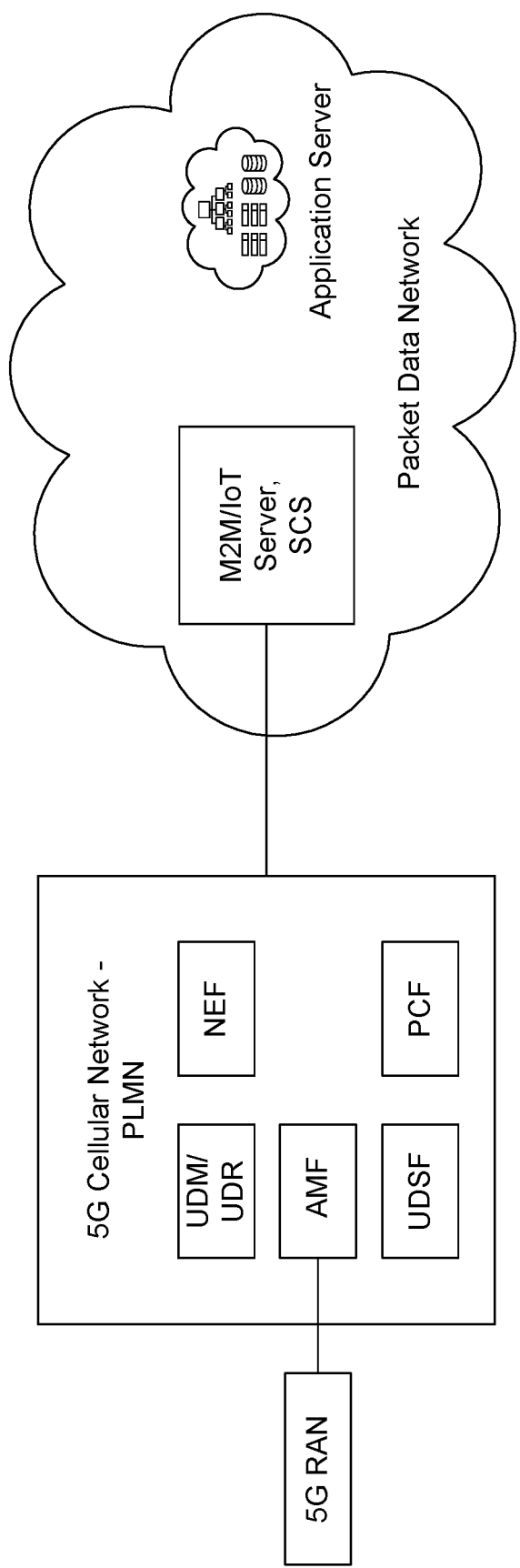
FIG. 2 shows a block diagram of a number of example cellular entities.

FIG. 2 shows a number of example cellular network entities and cellular network functions. These entities are briefly described below. Note that some of these descriptions are based on definitions included in (see 3GPP TS 23.503 v15.3.0).

Access and Mobility Management Function (AMF): A network function within a 5G cellular network that handles registration, connection, mobility, and reachability management. It may also be involved with security, access authentication, access authorization, and deriving the access network specific keys. The AMF may be similar in functionality to a MME.

Unified Data Management (UDM): A network function within a 5G cellular network that stores subscription information for the connecting device. The UDM may be similar in functionality to a HSS. Note that in some cases, the operator subscription information may be stored in a Unified Data Repository (UDR), in which case the UDM would be a form of front end that retrieves the subscription data from the UDR.

Network Exposure Function (NEF): A network function that exposes services and capabilities provided by a 5G 3GPP network. It may also provide a means for third party applications to provide information to the cellular network, such as mobility or communication patterns. The NEF may be similar in functionality to a SCEF.

Policy Control Function (PCF): A network function that manages the policies for a UE related to QoS, mobility, sponsored data, and UE route selection policy.

Unstructured Data Storage Function (UDSF): A 5G network function used to store unstructured data from any other network function. The UDSF may belong to the same PLMN where the network function that uses it is located. The UDSF may store UE context that is needed by a network function.

5G-RAN: A 5G radio access network that connects to the 5G core network (e.g., New Radio (NR) or Wi-Fi).

User equipments (UEs) in 5G may register to one or more network slices and establish a PDU session on a particular network slice instance. The UE may have a list of Subscribed S-NSSAIs as part of its subscription information. In addition, the UE may maintain an Allowed NSSAI and Configured NSSA. The Allowed NSSAI may denote the NSSAI provided by the Serving PLMN during a Registration procedure and may indicate the S-NSSAIs values the UE could use in the Serving PLMN for the current registration area. The Configured NSSAI may be the NSSAI provisioned in the UE that may be applicable to one or more PLMNs.

Figure 3:
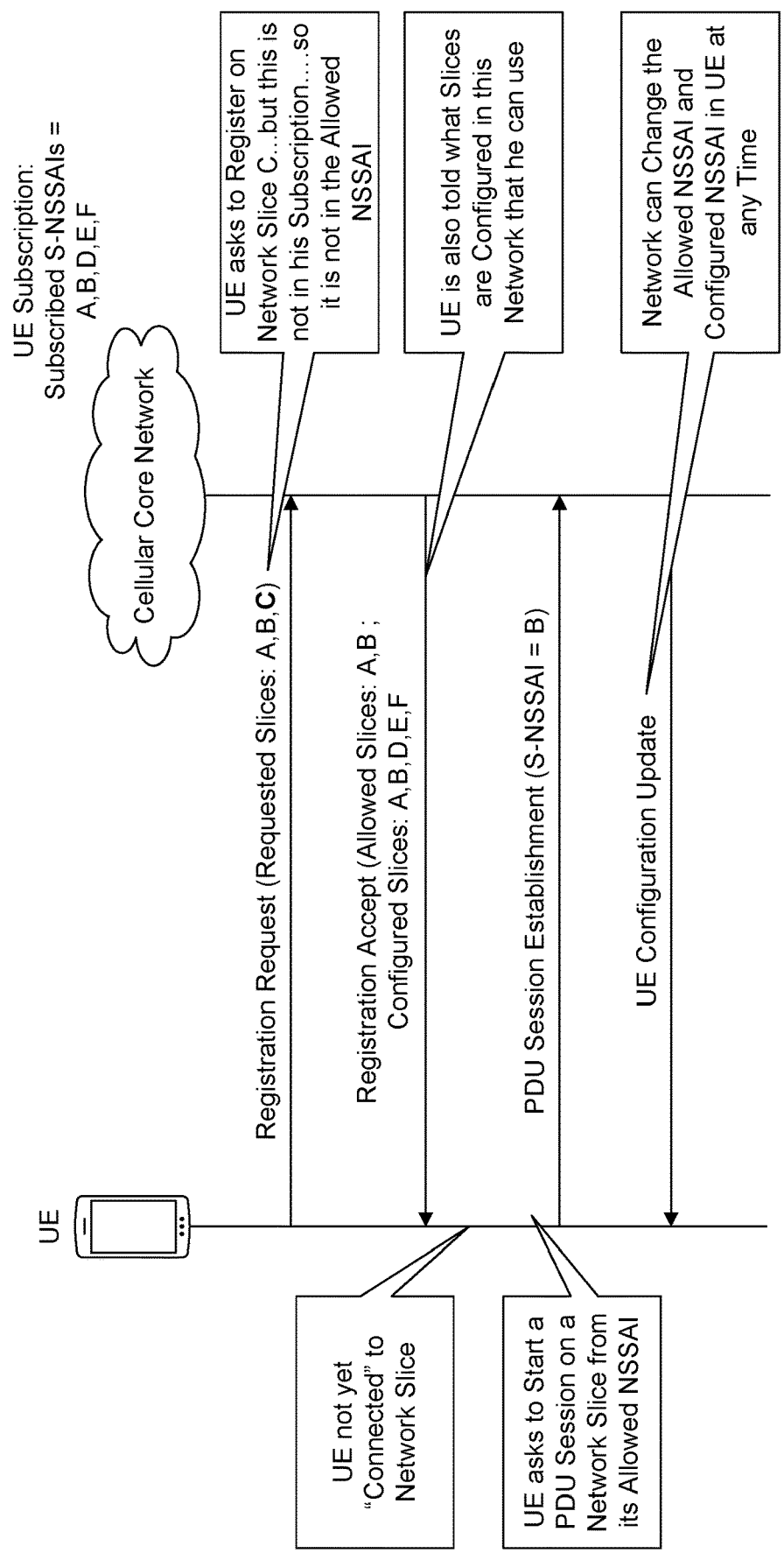
FIG. 3 shows a flow chart of an example slice selection method.

An example procedure for establishing a PDU session on a particular slice instance is shown in FIG. 3. The UE subscription has a Subscribed S-NSSAI list which indicates that the UE is subscribed to use slices A, B, D, E or F. At startup, the UE tries to register with the core network. The UE provides an indication of the slices it would like to have access to in the Requested NSSAI. The UE requests access to slice A, B, and C. As Slice C is not in the Subscribed S-NSSAIs list, the network accepts the registration, but also tells the UE that it is allowed to use only slices A and B (in Allowed NSSAI). The network may also tell the UE that in this cell, it is configured to use slices A, B, D, E, and F (in the Configured NSSAI).

At this point, the UE is not connected to any slice. This occurs only when the UE establishes a PDU session, at which time it provides an indication regarding the slice it wants to connect to. In the example shown, the UE requests to establish a PDU session on slice B. Note that the UE may not request to establish a PDU session on a slice that is not on either the Allowed NSSAI or Configured NSSAI. In such a case, the PDU session establishment request is rejected. At some later time, the network may change the Configured NSSAI and/or Allowed NSSAI assigned to the UE. This may be achieved through a UE Configuration Update message. This message may ask the UE to re-register so that it can "reset" it's Allowed NSSAI.

A device (also referred to herein as a UE) may host a number of capabilities. These capabilities may be divided into cellular capabilities and non-cellular capabilities. The cellular capabilities may be those related to the 3GPP communication capabilities of the user equipment. There are two example types of cellular capabilities. UE Radio Capabilities may contain information on RATs that the UE supports, such as power class and frequency bands, while UE Core Network Capabilities may contain information on non radio-related capabilities, such as NAS security algorithms. Non-Cellular capabilities may refer to all other capabilities of the user equipment. For example, this can be related to the capability of the user equipment to take still pictures and video, sense temperature and pressure, determine GPS location, and to communicate over WiFi.

Sponsored data connectivity may allow an Application Server to sponsor the data to and from a UE. The Application Server may provide the Sponsored data connectivity information to the core PCF to be stored in the UDR. This information may be provided via the NEF or directly to the PCF. The Sponsored data connectivity information may include:

The sponsor's identification;

Optionally, a usage threshold and whether the PCF reports these events to the AS; and Information identifying the application service provider and application (e.g., SDFs, application identifiers, etc.).

URSPs (UE Route Selection Policy) are polices that are provided by the PCF in the 5GC to the UE. These policies may be used by the UE to determine how to route outgoing traffic. Traffic can be routed to an established PDU Session, can be offloaded to non-3GPP access outside a PDU Session, or can trigger the establishment of a new PDU Session. URSPs may include an SSCMSP (SSC Mode Selection Policy) that is used to map traffic to an SSC mode. URSPs may include an NSSP (Network Slice Selection Policy) that is used to map traffic to an S-NSSAI. URSPs may include a Data Network Name (DNN) Selection Policy that is used to map traffic to a Data Network. URSPs may include access network preferences which are used to map traffic to an access network type. The UE may additionally or alternatively have local preferences that can be used to determine how to handle traffic. Local preferences may take precedence over URSPs.

An example use case discussed herein involves a large metropolitan city with a dense deployment of IoT devices. These devices range from very simple sensors to very complex autonomous vehicles. Each of these devices may have one or more device roles and may possess one or more device capabilities. The device role refers to the main purpose of the device (e.g., the reason why the device has been deployed) and describes how the device may be used or applied. The device capability is a list of one or more "supported features/capabilities" that the device has. For example, a smartphone may have the following device capabilities: cellular communication, WiFi communication, camera, GPS, accelerometer gyroscope, compass, etc. Device capabilities may be thought of as the supported features of a device. A few example roles and capabilities are described in Table 1.

TABLE 1

Device Roles and Device Capabilities for City Deployment

| Device | Device Role | Device Capability |
| --- | --- | --- |
| Parking sensor | Smart City Management | Communication |
| Traffic Monitor | Smart City Management | Communication Camera |
| Autonomous Flower Watering Truck | Smart City Management | Communication GPS Water pump |
| Drone | Package Delivery | Communication GPS Camera |
| Robot | Home yard maintenance (e.g. driveway snow removal, mowing the lawn, etc.) | Communication Camera Fine Motor control (e.g. ability to pick up small items) |
| Autonomous Taxi | transporting occupants to/from work | Communication GPS Camera |

A homeowner may have a yard robot that helps the homeowner with maintenance. The yard robot may have two primary device roles: clear the snow from driveway in winter and mow the lawn in summer. This device has many capabilities including communication capability that allows it to be remotely controlled, a camera to take still pictures to help it determine when there are obstacles in its path, and fine motor control to help it control the lawn mower, edge trimmer, snow blower, to pick up objects, etc.

Figure 4:
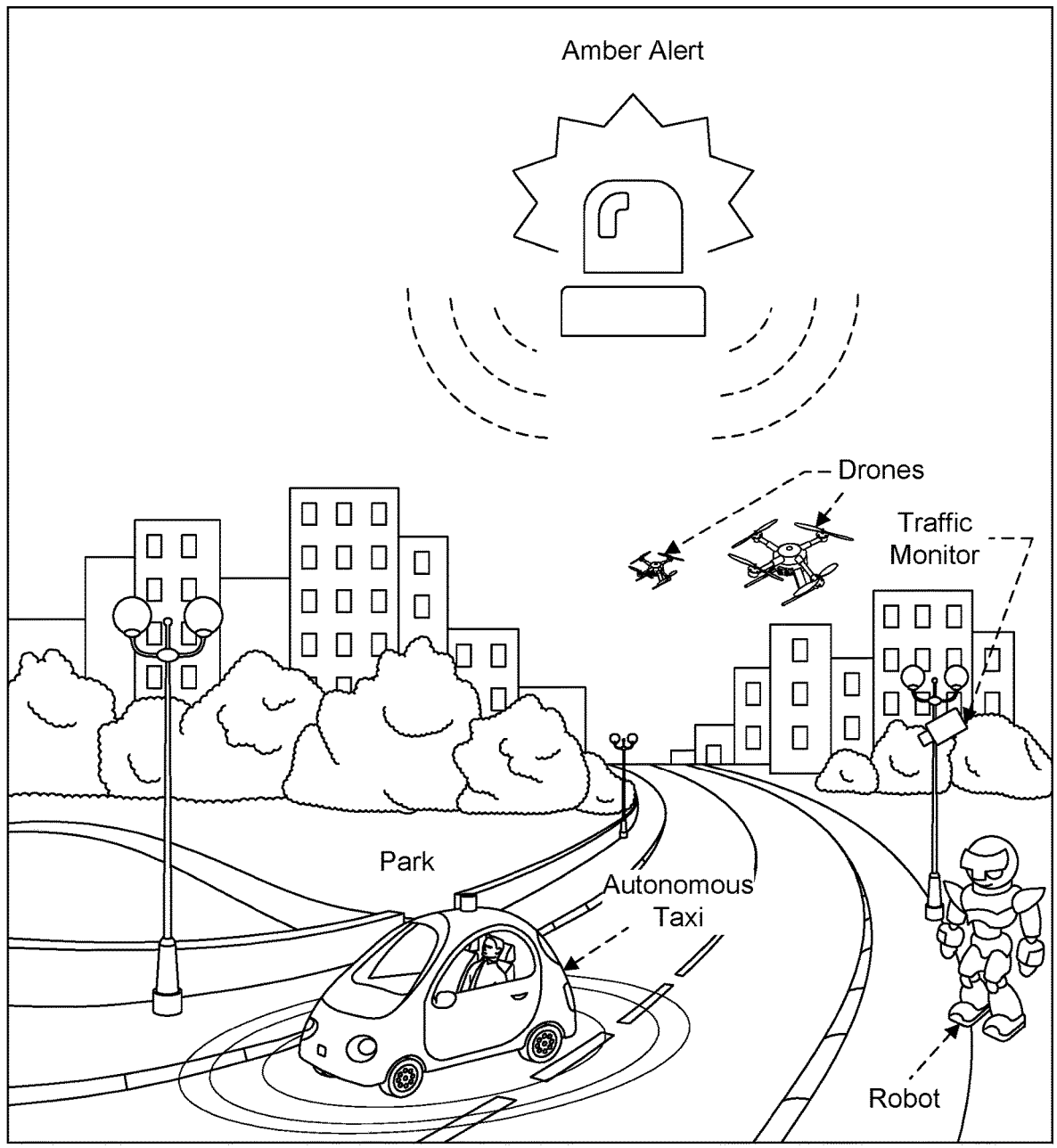
FIG. 4 shows a flow chart of an example amber alert video surveillance use case.

FIG. 4 shows the devices from Table 1 near the vicinity of a park. At some point, an Amber Alert is issued by the local authorities. The authorities suspect that the child may be near the park. Through the Smart City Management center, the authorities already have access to the camera of the Traffic Monitor device. However, this camera can only capture a small portion of the park at any time. Consequently, the authorities would also like all (or most) video capable devices near the park to start recording and to send the recorded video (and possibly any prior video) to a video analysis center. The cellular network provides the communication to all the devices near the park and helps in configuring all video capable devices. The IoT devices (traffic monitors, robots, taxis, drones, etc.) may turn on their video and start recording. Based on the configuration, the devices send their data to the analysis center. What is important to note in this use case is that the devices are being requested to operate in a role for which they were not primarily designed, in this case as video surveillance cameras.

The example use case shows a typical scenario where a third party application (for example, an application server owned by the local authorities) selectively uses some of the non-cellular capabilities of devices (e.g., robots, taxis, and drones). Note that the third party application may have no prior relationship with the devices, and the non-cellular capabilities of the devices may be used for a purpose that is different from their primary design role. In order to enable such a use case, the following issues may need to be resolved:

Issue 1: The third party application has no idea which devices possess the desired non-cellular capability. The third party application needs to be able to discover these devices. For example, the third party application may need to find all devices that have a steerable camera. If devices register their non-cellular capabilities to a Service Capability Server (SCS), then the SCS may be able to provide such a discovery service. However, this approach is not as efficient as having the non-cellular capabilities registered with the cellular network, and having the cellular network manage or assist in the discovery. Some of the benefits of going through the cellular network include:

Devices only need to register to the cellular network to share this info. They do not need to be aware of the responsible SCS, establish a security association with the SCS, and register to this SCS as well as to the cellular network. This can help simplify devices and their deployment/management;

The cellular network can have more awareness of non-cellular capabilities of devices and in turn can use this information to help it manage its network resources; and The cellular network may have additional information about the devices that would make the discovery operation more efficient. For example, the cellular network may know the location of the device, the reachability of the device, the cellular capabilities of the device, etc.

Issue 2: Once discovered, the third party application has no way to configure and control the non-cellular capability. Continuing with the example above, the third party application needs a way to tell the device to turn on the camera, point the camera to coordinate X, Y, Z, record low-resolution video for the next 30 minutes, and send the video to server a.b.c.

Issue 3: Once the device is configured, the communication path for the generated data needs to be set up. Continuing with the example above, the device may be connected to a network slice that is poor at managing streaming video. The third party application may need to request that the cellular network create a new PDU session on a different network slice for transporting the collected data.

Cellular devices are becoming more and more powerful, and may host a number of different non-cellular capabilities (cameras, accelerometers, sensors, etc.). Today, these capabilities are used mainly to provide some service to the device or the device owner. If one were to map these non-cellular capabilities in a scenario with a very dense device deployment, we would see a rich and diverse capability "toolbox." What is lacking is the ability to unlock this toolbox so that the capabilities can be used by third parties (such as Application Servers).

Disclosed herein are methods and systems for enabling devices to register their device capabilities with a cellular network, providing a mechanism for Application Servers to discover non-cellular capabilities, providing a mechanism to have the Application Servers configure these non-cellular capabilities, and preparing the UE and the network for cellular traffic generated as a result of the Application Server using this non-cellular capability. An example may include sending a message to the network that a UE may need to connect to a dedicated slice, and configuring the policies in the UE so that traffic generated from non-cellular capability may be routed to this dedicated slice.

It is understood that the third party using the non-cellular capability of the device may be an Application Server, and that the third party may additionally or alternatively be a Service Capability Server (SCS), an Application Function (AF), another core network, or another device. The term Non-Cellular Capability may denote a capability of a device that is in addition to cellular communication. The term is intended to be very broad. An example smartphone may have cellular capabilities (to use LTE), WiFi capabilities, camera capabilities, compass capabilities, GPS capabilities, etc. The non-cellular capabilities may be everything other than the LTE cellular capabilities. Thus, an example smartphone may have the following non-cellular capabilities: WiFi, camera, compass, GPS, etc.

In one example, a device may be configured to perform operations comprising receiving, from an application server, a request to install on the device an application that is configured to manage one or more non-cellular capabilities of the device; retrieving, from a provisioning server, the application; installing the application on the device; receiving, from a core network, a request to prepare the device for cellular traffic generated based on the application server using the one or more non-cellular capabilities of the device, wherein the request to prepare the device for the cellular traffic comprises an update to at least one of slice information associated with the device and traffic routing policies associated with the device; and initiating a protocol data unit (PDU) session for the cellular traffic.

The device may be further configured to perform operations comprising receiving, from the application server, a first installation key; receiving, from the provisioning server, a second installation key; and determining, based on the first installation key, that the second installation key is valid, wherein the application is installed on the device based on the determining that the second installation key is valid. The device may be further configured to perform operations comprising registering, with the core network, the one or more non-cellular capabilities of the device. Registering the one or more non-cellular capabilities of the device may comprise registering one or more details associated with the one or more non-cellular capabilities of the device and an interface to control the one or more non-cellular capabilities of the device. The one or more details associated with the one or more non-cellular capabilities of the device may comprise a manufacturer of the device, a model of the device, an operating system of the device, and a power source of the device.

Registering the one or more non-cellular capabilities of the device may comprise registering one or more access privileges of the device, wherein the one or more access privileges comprise specific entities that can use the one or more non-cellular capabilities of the device, types of entities that can use the one or more non-cellular capabilities of the device, and types of operations that can be performed using the one or more non-cellular capabilities of the device. The request to prepare the device for the cellular traffic may comprise schedule information associated with when the application server intends to use the one or more non-cellular capabilities of the device.

In another example, a core network function may be configured to perform operations comprising: receiving, from an application server, a request to discover a device with one or more non-cellular capabilities; sending, to the application server, an indication of a device with the one or more non-cellular capabilities; receiving, from the application server, a request for an interface definition associated with one or more of the non-cellular capabilities of the device; sending, to the application server, an indication of the interface definition associated with the one or more non-cellular capabilities of the device; receiving, from the application server, a request to configure the one or more non-cellular capabilities of the device; sending, to the device and as part of a non-access stratum (NAS) message, the request to configure the one or more non-cellular capabilities of the device; receiving, from the application server, a request to prepare the device for cellular traffic generated based on the application server using the one or more non-cellular capabilities of the device; and triggering the core network to push one or more policies and network slice selection assistance information (NSSAI) to the device.

The interface definition associated with the one or more non-cellular capabilities of the device may comprise one or more of configuration parameters for the non-cellular capabilities of the device, a delivery method for sending the one or more configuration parameters for the non-cellular capabilities of the device, and an indication of a server where the interface definition can be found. The configuration parameters may comprise one or more of a data type definition and a semantic definition associated with the interface definition. The core network function may be further configured to perform operations comprising discovering one or more devices with the one or more non-cellular capabilities, wherein discovering the one or more devices comprises determining one or more access privileges of the one or more devices to determine whether the application server is permitted to access the one or more non-cellular capabilities of the one or more devices.

The core network function may be further configured to perform operations comprising receiving, from the device, a request to register one or more non-cellular capabilities of the device with the core network function; and storing the one or more non-cellular capabilities of the device. The request to register the one or more non-cellular capabilities of the device may comprise one or more details associated with the one or more non-cellular capabilities of the device, wherein the one or more details associated with the one or more non-cellular capabilities of the device comprise a manufacturer of the device, a model of the device, an operating system of the device, and a power source of the device. The one or more non-cellular capabilities of the device may comprise one or more access privileges of the device, wherein the one or more access privileges of the device comprise specific entities that can use the one or more non-cellular capabilities of the device, types of entities that can use the one or more non-cellular capabilities of the device, and types of operations that can be performed using the one or more non-cellular capabilities of the device.

In another example, a network exposure function (NEF) may be configured to perform operations comprising: receiving, from an application server, a request to discover one or more non-cellular capabilities of a device; sending, to the application server, an indication of a device with the one or more non-cellular capabilities; receiving, from the application server, a request for an interface definition associated with a non-cellular capability of the device; sending, to the application server, an indication of the interface definition associated with the non-cellular capability of the device; receiving, from the application server, a request to configure the non-cellular capability of the device; sending, to a non-cellular capability management function (NCMF), the request to configure the non-cellular capability of the device; receiving, from the application server, a request to update subscription information of the device to enable third party use; and sending, to a unified data management service, the request to update the subscription information of the device to enable third party use.

Sending the indication of the interface definition may comprise sending an indication of where the interface definition may be retrieved by the application server. The network exposure function may be further configured to perform operations comprising receiving, from the application server, a request to update a route selection policy of the device; and forwarding, to a policy control function, the request to update the route selection policy of the device. The network exposure function may be further configured to perform operations comprising receiving, from the application server, a request to update a sponsored data policy of the device; and forwarding, to a policy control function, the request to update the sponsored data policy of the device.

The network exposure function may be further configured to perform operations comprising receiving, from the application server, a request for permission to access a non-cellular capability of one or more devices for which the application server does not currently have access; and sending, to the NCMF, the request for permission for the application server to access the non-cellular capability of the one or more devices for which the application server does not currently have access. The request for permission for the application server to access the non-cellular capability of the one or more devices for which the application server does not currently have access may comprise one or more of a time window, a schedule, a priority, or a QoS requirement for the application server to access the non-cellular capability of the one or more devices.

UE subscription information may be modified to include one or more of the following:
Application Server Use of Non-Cellular Capabilities: This is an indication of whether the device allows an Application Server to use its non-cellular capabilities;
Core Network use of Non-Cellular Capabilities;
Service White List: This may be a list of services which are allowed to use the non-cellular capabilities of the device. These services may be from a known or standardized list. Example services may include public safety, traffic management, and city planning. The list may also specify one or more of the following for each service: a list of Application Servers (e.g., via IDs or IP addresses) which are allowed to use or are barred from using the Non-Cellular Capabilities, a list of types of Application Servers which are allowed to use or are barred from using the Non-Cellular Capabilities, access schedules (e.g., when these Application Servers are allowed to use the Non-Cellular Capabilities), and allowed operations (e.g., the types of operations that the Application Servers are allowed to perform on these Non-Cellular Capabilities); and
Non-Cellular Capability Whitelist: This may be a list of non-cellular capabilities that are allowed to be shared with Application Servers based on the device owner's subscription. For example, this may include: a digital camera, a GPS, an accelerometer, fine motor control, a floodlight, etc. These may be from a standardized list. Additionally or alternatively, this may also be a blacklist of non-cellular capabilities which should never be shared with Application Servers.

In a first aspect of the disclosure, methods and systems for enabling devices to register their device capabilities with a cellular network are disclosed.

Non-cellular device capabilities may be stored in a capability repository in the cellular core network and may be managed by a Non-Cellular Capability Management Function (NCMF). The capability repository may be located on the NCMF, in the UDSF used by the NCMF, and/or in the UDM, UDR, or HSS. The NCMF may be a new network function, or may be part of an existing network function (such as the AMF or Network Repository Function (NRF)). The NCMF may also have other names such the Application Capability Management Function (ACMF) or the third Party Capability Management Function (3bCMF).

Figure 5:
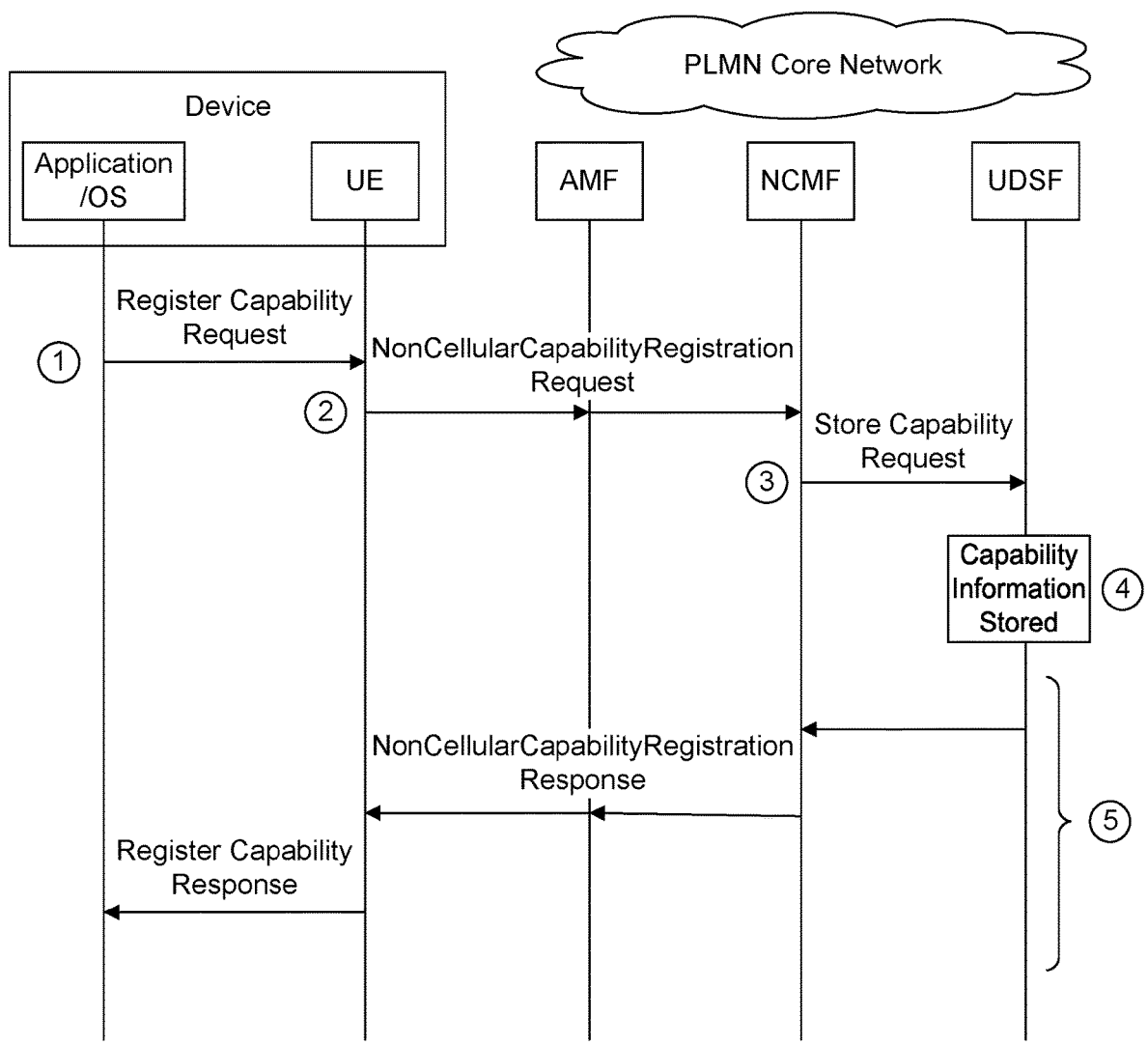
FIG. 5 shows a flow chart of an example capability registration procedure.

An example capability registration procedure is shown in FIG. 5 and described below:

At step 1, an application, service, or capability of the device determines that a non-cellular capability should be registered or advertised to the core network. This application may be a dedicated application on the device, a service running on the device, or the operating system of the device. The device may trigger this determination for any number of reasons, including but not limited to after every power on, on installation of a new application, on every device reboot, for every initial registration attempt to the cellular network, or periodically. The application may issue a Register Capability Request to the UE in the device requesting that the UE register the non-cellular capability with the core network. The request may include one or more of the following:

A Non-Cellular Capability ID: a local ID generated by the application used to help identify the capability. This ID may be something that is standardized (e.g., via some registry or by a manufacturer);

A Device ID: An identifier that uniquely identifies the device (e.g., a PEI). This may be an Electronic Product Code (EPC) of the device or some other unique identifier. It may additionally or alternatively be a combination of identifiers to help uniquely identify a device. For example, this may be the combination of the model number and serial number;

A Non-Cellular Capability: The capability that is being registered. For example, this may include: digital camera, GPS, accelerometer, fine motor control, floodlight, etc. These may be from a standardized list;

A Non-Cellular Capability Detail: This provides additional information about the device. For example, for a digital camera, the Device Capability Detail may specify that the camera is steerable, that the camera has a maximum resolution on 720 dpi, etc.;

A Non-Cellular Capability Interface Definition: This provides an indication of how to configure the capability. For example, for a steerable camera, the interface definition may specify that the following has to be configured: on/off, resolution, and direction to point camera. Additionally or alternatively, this may contain an address or URL where the interface definition may be obtained. The Interface Definition includes the Configuration Parameters for the non-cellular capability, as well as the Delivery Method to use to send the Configuration Parameters to the device;

A Non-Cellular Capability Hardware Identifier: An identifier of the device type or chipset. For example, for a digital camera, the identifier may be "S5K4E6," which identifies a particular camera sensor;

Device Restrictions: Lists any restrictions associated with the device capability. For example, this may specify that a digital camera may only be used for public security, or may only be used if battery levels are above 50%;

Device Manufacturer: The manufacturer of the device;

Device Operating System: The operating system used by the applications that use the non-cellular capabilities. This may be the operating system used in the device's application processor. This may also be from a known or standardized list.

Device Power Source: Indication if the device is battery powered or not; and

Non-Cellular Capability Access Privileges/Restrictions: This may include but is not limited to the following: specific entities or Applications Servers that are allowed/prohibited to access the capability, types of entities or Applications Servers that are allowed/prohibited to access the capability, types of operations that are allowed/prohibited on the capability, access schedule of when the capability may be or may not be used by an Application Server, allowed/prohibited locations where the capability may be used, and types of compensation that is necessary to allow use of the non-cellular capability (sponsoring of the data, network credit, etc.).

This message may be sent over an internal device Application Programming Interface (API) or through a new AT command.

At step 2, the device UE sends a NonCellularCapability Registration Request NAS message to the core network NCMF via the AMF. This message may contain the information included in the Register Capability Request from Step 1. This message may be sent through a new NAS message or as a new IE in an existing NAS message (for example, in the Registration Request).

At step 3, the NCMF first checks to see if the UE subscription allows for Application Servers to discover or access the hosting device's non-cellular capability. If not, the registration request is rejected.

At step 4, if allowed, the non-cellular capability is stored. This information may be stored in the NCMF, in the UDSF used by the NCMF, and/or in the UDM/UDR.

At step 5, a response is sent back to the UE to acknowledge the registration request.

In a second aspect of the disclosure, methods and systems for Application Servers to discover non-cellular capabilities are disclosed.

Figure 6:
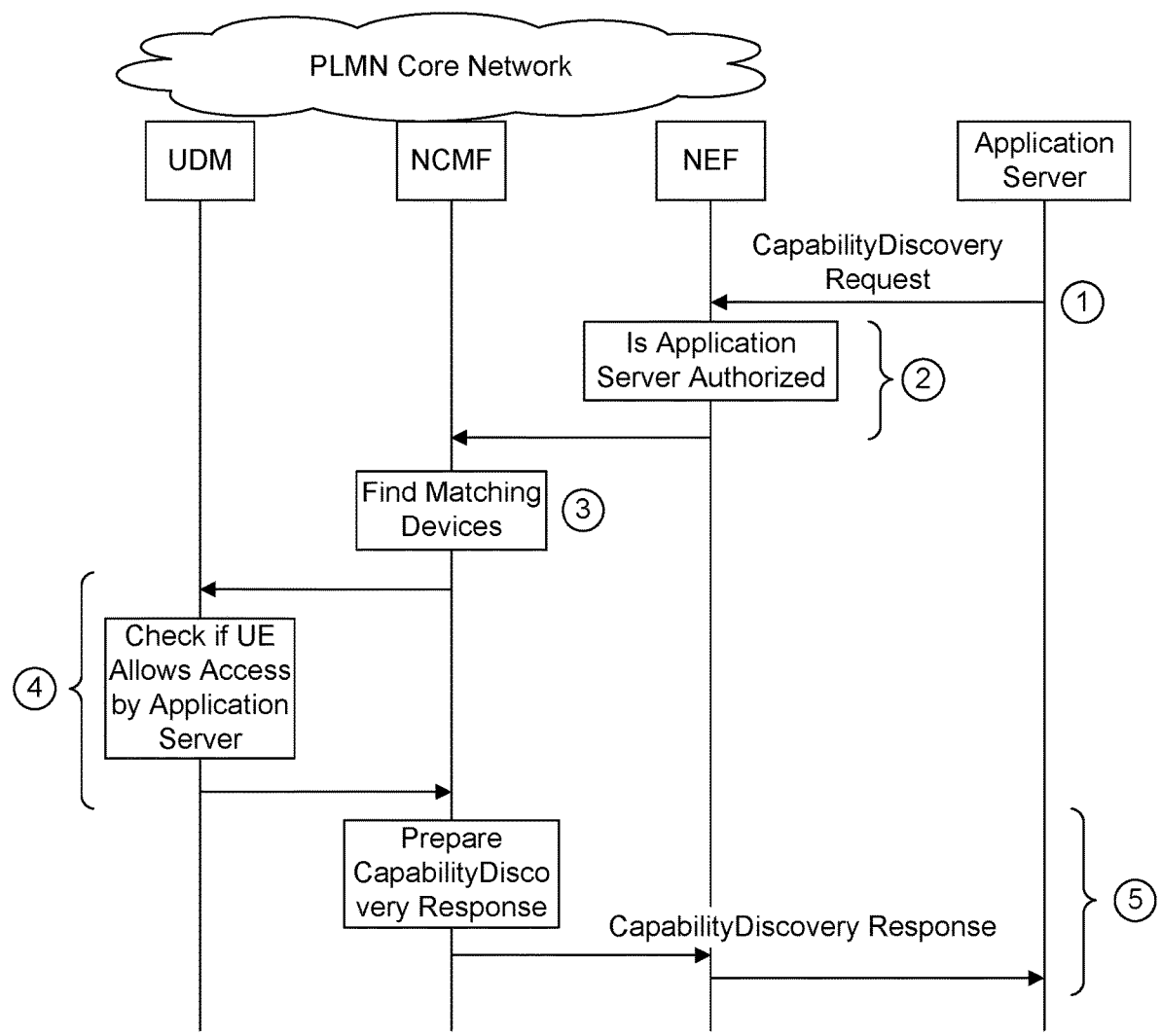
FIG. 6 shows a flow chart of an example capability discovery procedure.

An Application Server may know that it needs to find devices with a certain non-cellular capability and at a certain location. The Application Server may ask the cellular network for assistance, as shown in the example of FIG. 6 and discussed further below. It may be assumed that there is a trust relationship that exists between the cellular network and the device and between the cellular network and the Application Server. The cellular network can serve as a trust broker to allow/deny an Application Server access to a device's capabilities. This may be based for example on the security requirements/preferences of the device (or device owner) and the security profile of the Application Server.

At step 1, the Application Server issues a CapabilityDiscovery Request to the NEF to find devices with a certain non-cellular capability. This request may be sent to the NEF and may include one or more of the following fields:

Non-Cellular Capability List: A list of non-cellular capabilities that the Application Server is looking for. This may be from a known or standardized list. The list may be provided at various levels of granularity, such as GPS generically vs. Differential or Assisted GPS, etc.;

Desired Service: As an alternative to the non-cellular capabilities list or to provide further context, the Application Server may provide an indication of "why" it needs the capabilities or the service it intends to offer with the non-cellular capabilities. For example, an Application Server may request that it needs to offer a public safety service for an Amber Alert. A core network may interpret this desired service request as a request for all devices that have video capability and/or camera capability;

Desired Operation: Provides the operation that the Application Server wishes to perform;

Desired Location: A location where the Application Server wants the non-cellular capabilities to be. This may be in the form of, for example, a GPS coordinate, a geofence, a cell, a tracking area, or some other physical location. The Application Server may specify the desired height of the device hosting the non-cellular capability;

Application Server Location: The Application Server may provide an indication of its own location. This may allow the core network to select non-cellular capabilities which are more proximal to the Application Server;

Preferred RAT: The Application Server may request that the device hosting the non-cellular capability support one or more RATs;

Preferred Response: The Application Server may ask that the cellular network create a group for the discovered devices and return the group TMGI and/or provide an individual list of devices that match the discovery criteria;

Other Device Status: The Application Server may specify certain specific device characteristics in its search criteria. For example, the Application Server may prefer that the device have a specific Operating System, not be battery powered, be reachable, be in connected mode, not be in DRX mode, etc.;

Number of devices: The Application Server may specify a maximum number of host devices that it is looking for;

Non-Cellular Capability Use Schedule: The Application Server may specify when it needs the non-cellular capability. For example, the Application Server may supply a time period. This may be performed to guarantee that the device is reachable when it is needed;

Minimum Cellular Capability: The Application Server may specify a minimum radio capability for the device. For example, the Application Server may specify that the device have a cellular radio that supports at least a 10 Mbps uplink transfer rate; and Callback Address: This could be an identifier (e.g., URI) that the NEF could use to notify the Application Server when a device supporting the requested non-cellular capability and meeting any additional specified requirements of the Application Server (e.g., location, QoS, schedule, privileges) becomes available. It may be taken as an implicit request to the cellular network to monitor for devices that have matching non-cellular capabilities.

At step 2, the NEF checks if the Application Server is authorized to make a capability discovery request. If so, it forwards the request to the NCMF.

At step 3, the NCMF searches the capability repository to find matching devices. As part of this search, the NCMF may also use one or more of the following:

A Desired Location to find all devices that are in the correct location. The NCMF may query the AMF to determine if a device with matching capabilities is in the Desired Location;

A Non-Cellular Capability Use Schedule to only select devices which are reachable when needed;

A Minimum Cellular Capability to only select devices that have this minimum cellular capability; and/or Other Device Status to only select devices that have a matching device status.

At step 4, the cellular network may verify the device subscription to see if the device allows Application Servers access to its non-cellular capabilities and/or to see if the Application Server is allowed to access these capabilities based on the whitelist and or blacklist maintained in the subscription. For example, the cellular network may verify one or more of the following: the Application Server is on the list of allowed Application Servers (or not on the list of prohibited Application Servers), the Application Server type is on the list of allowed types (or not on the list of prohibited types), the Non-Cellular Capability Use Schedule matches the Access Schedule tied to the subscription, the Desired Operation is part of the Allowed operations from the Application Servers, and the Desired Non-Cellular Capability is on the Whitelist of non-cellular capabilities (or not on the blacklist of non-cellular capabilities).

At step 5, based on the Application Server request, the NCMF may create a group for the devices that match the criteria and provide the External Group ID or TMGI to the Application Server in a CapabilityDiscovery Response. The NCMF may package the individual device identities in the CapabilityDiscovery Response.

The CapabilityDiscovery Request may include a Callback Address. In such a case, the inclusion of the Callback Address may be an implicit request to have a long standing discovery request asking the cellular network to monitor for devices with matching non-cellular capabilities. When such devices are discovered (for example, a new device registers to the cellular network or moves into a Desired Location), the cellular network may send a CapabilityDiscovery Response to the Application Server.

In a third aspect of the disclosure, methods and systems for configuring non-cellular capabilities by the Application Servers are disclosed.

Once the Application Server knows the devices that host the non-cellular capabilities, the Application Server may need to configure these devices. This may include providing to the devices some or all of the logic and parameters necessary to take advantage of the non-cellular capabilities. For example, this may involve installing an application on the device to control the non-cellular capabilities and/or providing configuration parameters for the non-cellular capabilities (e.g., camera pointing direction, camera resolution, etc.).

Figure 7:
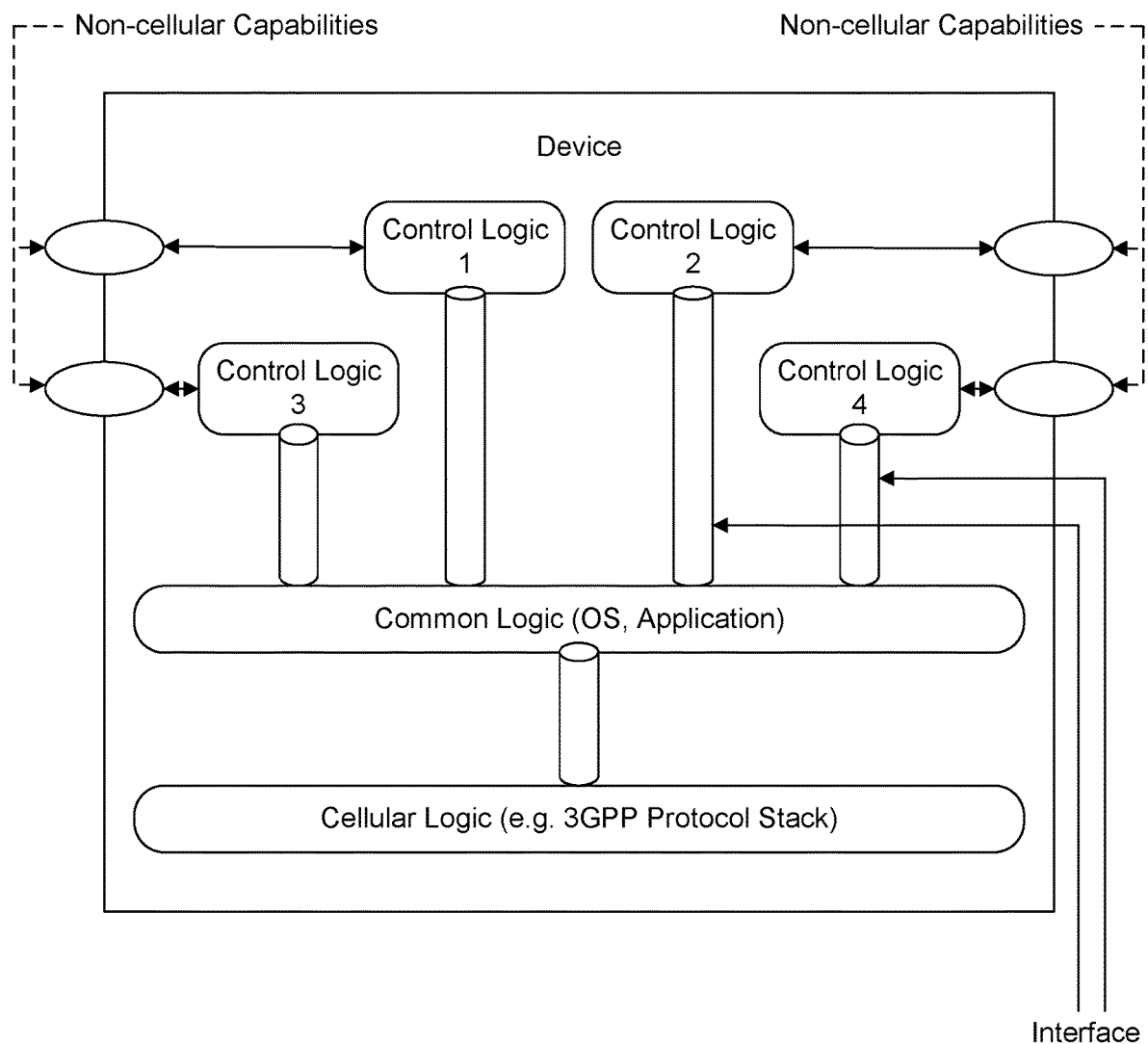
FIG. 7 shows an example software view of a device.

FIG. 7 shows an example device hosting multiple non-cellular capabilities. From a software perspective, a typical device may have three types of processing blocks or logic blocks:

Control Logic Block: Each of the non-cellular capabilities may be controlled by control logic. For simple non-cellular capabilities, the control logic may be a hardware driver, whereas for more complex non-cellular capabilities, the control logic may be an application running on the device;

Cellular Logic Block: The cellular logic may be responsible for managing the control plane protocols of the cellular system. For example, the cellular logic may handle the NAS and Access Stratum protocols of the 5G system; and Common Logic Block: The common logic may be responsible for communicating with each of the control logics through an interface. Examples of the common logic include an application running on the device, the operating system running on the device, and/or a device management client running on the device (such as an OMA DM client). The common logic may have an interface to the control logic of each non-cellular capability. This interface may be used to provide the necessary parameters to control the non-cellular capability. In addition, the common logic may also communicate with the cellular logic to retrieve or send user plane or control plane messages over the cellular network.

From a physical perspective, it is understood that the control logic may run on any processor within the device. In one implementation, in devices that have a separate application processor and baseband processor, the cellular logic typically runs on the baseband processor while the control logic and common logic typically run on the application processor. In another implementation, in devices that have a single processor, the control logic, common logic, and the cellular logic may run on the same processor. In yet another implementation, in devices that have a separate application and baseband processor, the control logic may be split across both processors. As a result, the cellular logic, common logic, and one or more control logic may run on the baseband processor, while the remaining control logic and common logic may run on the application processor. Note that the figure does not show the hardware necessary to communicate over the cellular network, the processors on which the cellular logic and control is running, as well as any other radio capabilities. For example, the device may host a WiFi radio, a Bluetooth radio, etc. These are not shown in the figure.

The interface between the common logic and the control logic may be used to provide the necessary parameters to configure the non-cellular capability. The interface may have an interface definition which defines the configuration parameters and the delivery method to use to provide these configuration parameters to the device.

The configuration parameters may be a comma separated list of configurable parameters that are tailored to the non-cellular capability. Using a humidity sensor as a representative example, the configuration parameters may include a comma separated list of parameters that may be configured for the sensor: on/off, recipient URI, sampling interval (sec). The configuration parameters definition may include a list of parameter level descriptions/schema definitions consisting of supported data types and/or a semantic definitions.

The delivery method denotes the mechanism that an Application Server may use to provide the Configuration Parameters to common logic of the device. Example Delivery Methods include but are not limited to the following:

Device management signaling. The configuration parameters of the non-cellular capability may be delivered through DM signaling. The common logic may be a DM client running on the device. The interface definition may also include the address of the DM server (such as an OMA management server);

User plane signaling. The configuration parameters of the non-cellular capability may be delivered through the user plane. The common logic on the device may be an application that is always listening for user-plane messages that contain configuration information for the non-cellular capabilities. The interface definition may include the address of the device and a port number associated with the listening application;

Control plane signaling. The configuration parameters of the non-cellular capability may be delivered through control plane signaling. The common logic may be an application that has access to the control plane signaling from the cellular logic (e.g., a NAS message such as a Configuration Update); and SMS signaling. The configuration parameters of the non-cellular capability may be delivered through SMS messages. The common logic may be the SMS handler in the device.

Two examples are discussed below depending on whether or not the device has the necessary control logic for the non-cellular capability.

In a first example, the device already has the necessary logic to control the non-cellular capability. This may be for non-cellular capabilities which have a simple interface, or for non-cellular capabilities which have a very well-known or standardized interface. For example, the non-cellular capability may be a non-steerable floodlight. In this case, the only control available to an Application Server is to turn ON or OFF. In another example, the non-cellular capability may be a humidity sensor which takes readings every ten minutes. The sensor's control logic is configured to report its sensor readings to the local weather monitoring company, but the control logic may also have a standardized or known interface which enables configuring of further recipient(s) of this sensor data.

In a second example, the device does not have the necessary logic to control the non-cellular capability. This may be for more complex non-cellular capabilities which are difficult to control via an interface, or for non-cellular capabilities which may have never been intended to use the cellular network. An example of the former may be a steerable video camera with variable resolution. To use this non-cellular capability, one may need to provide a pointing direction to the camera, a resolution, a recipient of the data, how often to send the data, etc. An example of the latter may be a camera on an industrial robot. The robot may use the camera to detect shipping boxes, identify the shipping boxes, and transport the shipping boxes to a different location. The robot may only use the images internally and has no logic to take pictures and transmit these pictures to a recipient.

In accordance with the first example, the device may host the non-cellular capability as well as the logic to control this capability. It is assumed that the Application Server knows the interface to the control logic of the non-cellular capability. This knowledge may be part of the capability information maintained in the core network (e.g., information obtained from the non-cellular capability registration), obtained from a third party (such as the manufacturer of the device), and/or known a priori (e.g., either standardized or well-known).

Figure 8:
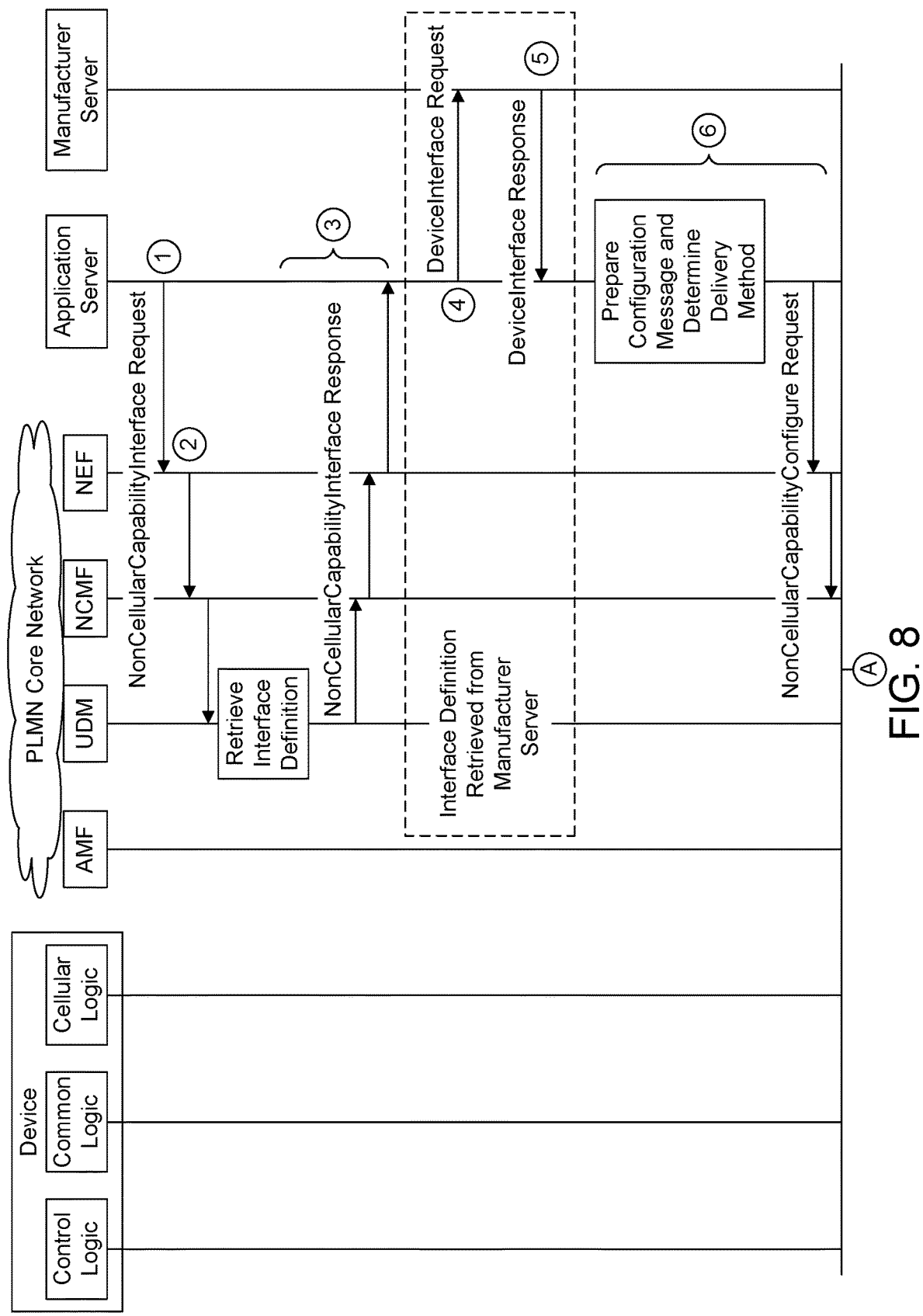
FIG. 8 shows a flow chart of an example method for non-cellular capability configuration where the device has control logic.
Figure 8:
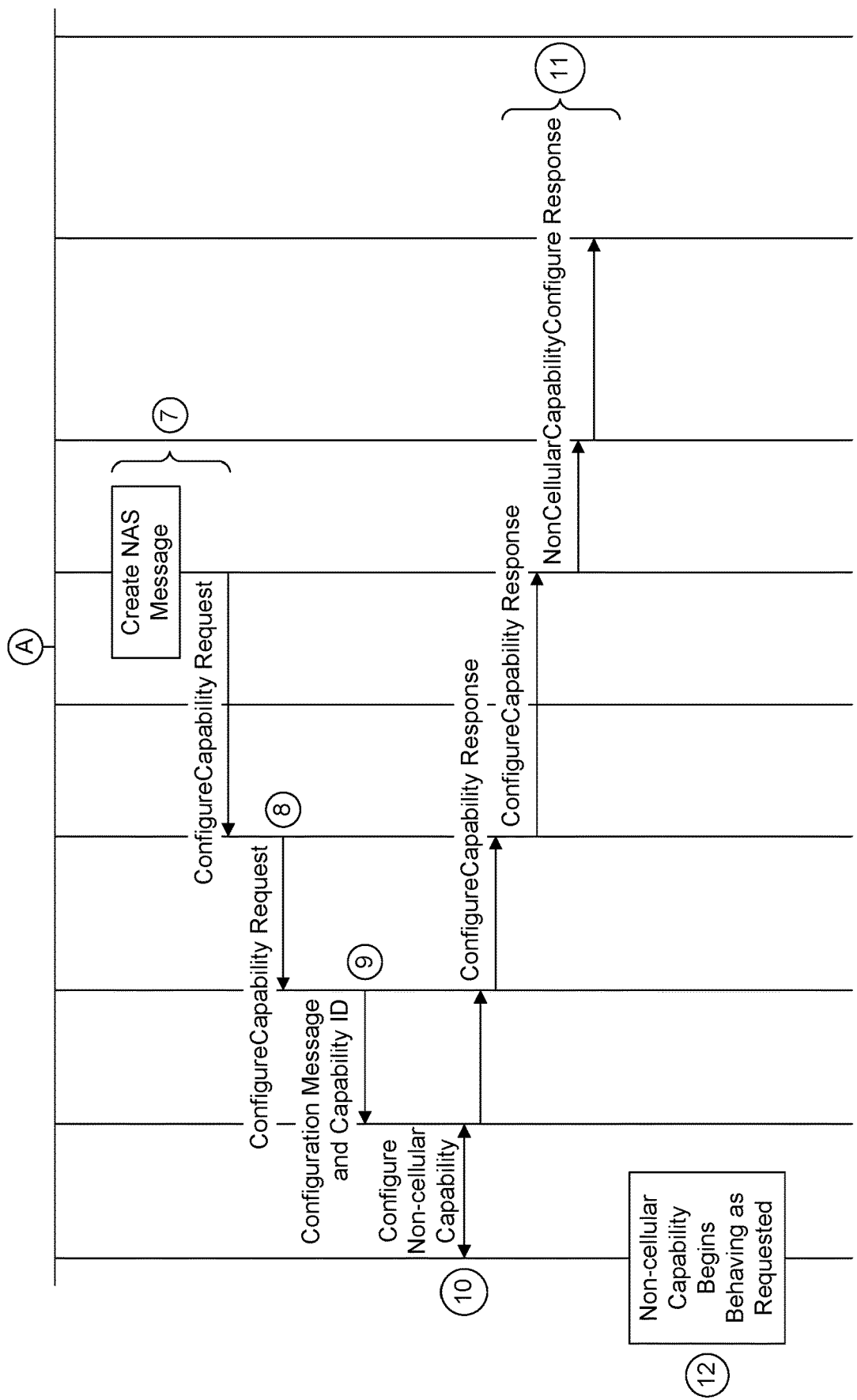

An example method for configuring the non-cellular capability of the device is depicted in FIG. 8 and discussed further below. It is assumed that the Application Server has already discovered the devices that host the desired non-cellular capabilities.

At step 1, if the Application Server does not know the interface definition of one or more of the discovered devices, the Application Server issues a NonCellularCapabilityInterface Request to the NEF. This request may include a list of Device IDs. The Device ID may include but is not limited to an IP address, GPSI, SUPI/IMSI, 5G-TMSI/TMSI, 5G-GUTI/GUTI, External Id, MSISDN and/or some other external identifier.

At step 2, the NEF verifies that the Application Server is authorized to request non-cellular capability interface information and forwards the request to the network function where the non-cellular capability information is stored. The network function is shown in the figure as the UDM/UDR, but it is understood that this may be the UDSF, UDR, HSS or any similar network function.

At step 3, the UDM handles the request and returns a NonCellularCapabilityInterface Response to the NEF. The NEF may forward this to the Application Server.

For devices for which the core network has interface definitions, the NonCellularCapabilityInterface Response message may include the interface definition, a Capability ID (to help identify the non-cellular capability within the device), and/or an operating system identifier (to identify the operating system running on the device). The interface definition may be carried transparently by the cellular network and may be provided in a form that is understood by the Application Server.

For devices for which the core network does not have the interface definition, the NonCellularCapabilityInterface Response message may include the address of the server from which this information may be found, a Capability ID, and/or an operating system identifier. In the example of FIG. 8, this is shown as the Manufacturer Server (e.g., a server maintained by the manufacturer of the device) from where the interface definition may be retrieved.

At step 4, for those devices for which the Application Server needs to retrieve the interface definition from a Manufacturer Server, the Application Server issues a DeviceInterface Request to the Manufacturer Server. This message may include but is not limited to one or more of the following:

A Device Type (e.g., a model number);
A Device ID (e.g., a serial number, PEI/IMEI, etc.); and
A Non-cellular capability for which the interface definition is requested. This may be necessary if the device has multiple non-cellular capabilities. For example, for a smartphone this may be a camera, a gyroscope, an accelerometer, etc. This may be the Capability ID returned in step 3.

At step 5, the Manufacturer Server retrieves the interface definition for the non-cellular capability and provides it to the Application Server in a DeviceInterface Response.

At step 6, the Application Server would like to use a non-cellular capability on one of the devices that it has identified. Based on the interface definition of this non-cellular capability, the Application Server prepares a Configuration Message that includes the Configuration Parameters. Using the humidity sensor example, the Application Server may prepare the following Configuration Message for the humidity sensor: "on", "server1.cmpo.com", "10". Also based on the interface definition, the Application Server may determine the delivery method for the Configuration Message. The Application Server may send a NonCellularCapabilityConfigure Request to the NEF which may include one or more of the following:

A Device ID;
A Capability ID; and
A Configuration Message.

At step 7, the NEF forwards the message to the NCMF. The NCMF extracts the Configuration Message and creates a new NAS message (ConfigureCapability Request) that includes the Capability ID and Configuration Message. This message is sent to the AMF serving the device. Note that the NCMF may be co-located with the AMF or NRF.

At step 8, the AMF sends the ConfigureCapability Request to the device. If necessary, the AMF may first page the device so that it starts a signaling connection with the core network. The request may indicate an application ID that the message should be routed to. The application ID may be a port number. The request may provide the Configuration Message that should be used to configure the non-cellular capability.

At step 9, the cellular logic in the device extracts the Configuration Message and sends it to the Common Logic, along with the Capability ID.

At step 10, the Common Logic provides the configuration information to the non-cellular capability Control Logic. The Control Logic then configures the non-cellular capability.

At step 11, the cellular logic may return a confirmation NAS message to the core network (ConfigureCapability Response) and the core network may return a confirmation response to the Application Server (NonCellularCapabilityConfigure Response).

At step 12, the non-cellular capability begins behaving as requested by the Application Server. Using the humidity sensor example, the sensor would begin taking humidity measurements every ten seconds (sampling interval (sec)=10) and reporting the results to server1.cmpo.com. The UE Application may contact the application Server or a configuration server in order to receive a new application or application layer configuration.

In accordance with the second example, the device may host the non-cellular capability but may not have the control logic to configure the capability exposed to an Application Server. For example, an Application Server may want to have a video camera pan over a certain region once every two minutes until 5 PM, and stream the recorded video to server2.plcdpt.com. The control logic may have to control the motion of the camera to implement this panning operation. In such cases, the Application Server may need to deploy the control logic to the device. The control logic may be a dedicated application that already has all the Configuration Parameters necessary to configure the non-cellular capability. It is assumed that the Application Server already has various versions of this control logic, depending on the operating system of the device hosting the non-cellular capability.

An example method for deploying the control logic is shown in FIG. 9 and discussed further below. It may be assumed that the Application Server has already discovered the devices that host the desired non-cellular capabilities.

At step 0, it may be assumed that the Application Server already has various versions of this control logic, depending on the operating system of the device hosting the non-cellular capability.

At step 1, the Application Server may need to determine information about the device, such as the operating system that is running on the device. The control logic may need to be tailored to this operating system. If the Application Server does not know the operating system of one or more of the discovered devices, the Application Server may issue a NonCellularCapabilityInterface Request to the NEF. This request may include a list of Device IDs. The device ID may include but is not limited to an IP address, GPSI, SUPI/IMSI, 5G-TMSI/TMSI, 5G-GUTI/GUTI, MSISDN, or some other external identifier.

At step 2, the NEF verifies that the Application Server is authorized to request non-cellular capability interface information and forwards the request to the network function where the non-cellular capability information is stored (shown in the figure as the UDM).

At step 3, the UDM handles the request and returns a NonCellularCapabilityInterface Response to the NEF, which forwards this to the Application Server.

For devices for which the core network has interface definitions, the NonCellularCapabilityInterface Response message may include the interface definition, a Capability ID (to help identify the non-cellular capability within the device), and/or operating system ID (to identify the operating system running on the device). The interface definition may be carried transparently by the cellular network, and may be provided in a form that is understood by the Application Server.

For devices for which the core network does not have the interface definition, the NonCellularCapabilityInterface Response message may include the address of the server from which this information may be found as well as a Capability ID. In the call flow, this is shown as the Manufacturer Server (e.g., a server maintained by the manufacturer of the device) from where the interface definition may be retrieved.

At step 4, for devices for which the Application Server needs to retrieve the interface definition or operating system identifier from a Manufacturer Server, the Application Server issues a DeviceInterface Request to the Manufacturer Server. This message may include but is not limited to one or more of the following:

A Device type (e.g., a model number);
A Device ID (e.g., a serial number, PEI/IMEI, etc.); and
A Non-cellular capability for which interface definition is requested. This may be necessary if the device has multiple non-cellular capabilities. For example, for a smartphone this may be: a camera, a gyroscope, an accelerometer, etc. This may be the Capability ID returned in step 3.

At step 5, the Manufacturer Server retrieves the operating system identifier of the device and the interface definition for the non-cellular capability and provides this information to the Application Server in a DeviceInterface Response.

At step 6, the Application Server sends an SMS message to the device. The SMS message may contain one or more of an indication that the Application Server intends to download Control Logic to the device, and an Installation Key. The Key may be used in step 11 to confirm that the request to install the Control Logic is valid. Additionally or alternatively, the SMS message may contain an address (e.g., a URI) of a download server for the device to initiate the download from.

At step 7, the SMS handler in the device provides the Installation Key to the Common Logic. In this case, the common Logic may be the application that handles App installations. The SMS Handler may notify the Common Logic that a download request is forthcoming, and that this request may include the supplied Key. The Common Logic may be an OTA client running on the device or some other dedicated application.

At step 8, the application in step 7 may begin to monitor for the Control Logic download.

At step 9, the Application Server provides the Control Logic to the cellular network's OTA provisioning server along with the Device ID and the Installation Key that was provided to this device in step 6. The OTA provisioning server may be an entity used by a mobile operator to configure cellular parameters in a device, update the firmware of a device, and/or remove or install applications on a device. The entity may not be a 3GPP standardized CN entity, but may use standard protocols such as OMA DM (see OMA DM, OMA Device Management Protocol, Version 1.3).

At step 10, the OTA provisioning server pushes the Control Logic to the device. As part of this step, the OTA provisioning server may also provide the Installation Key.

At step 11, the device verifies that the Installation Key in the OTA provisioning matches the Installation Key provided by the Application Server in step 6. If yes, the device installs and begins to run the Control Logic.

At step 12, the non-cellular capability begins behaving as requested by the Application Server. Using the panning camera example, the camera would start panning over the specified region once every two minutes and streaming the recorded video to server2.plcdpt.com, and would stop recording and streaming at 5 PM.

In the example above, the Installation key is provided to the device by the Application Server using an SMS message. In another example, the Installation Key may be a property of the device. In such a case, the device may provide the key to the cellular network as part of its device capability registration. The Installation Key may be retrieved by the Application Server from the cellular network when the Application Server obtains the non-cellular capability interface definition. Alternatively, the Application Server may not retrieve the key, but may instead ask the cellular network to provide the Installation Key directly to the OTA Provisioning Server when the Application Server initiates a control logic install. In another example, the device manufacturer may provide the key to the Application Server.

Note that the Installation Key may also be used in an example that the Device has the Control Logic. In this case, the keys would allow the Common Logic to verify that the ConfigureCapability Request is from the Application Server that generated the Installation Key.

The Control Logic installation of FIG. 9 is shown through a generic OTA provisioning step (e.g., step 10). This step allows the Control Logic to be provided to the device. The actual mechanism is not detailed in figure, but it may be through a push mechanism (OTA provisioning server sending the Control Logic to the device) or through a pull mechanism (OTA provisioning server asking the device to retrieve the Control Logic). Also in FIG. 9, the OTA provisioning server is shown as being managed by the mobile operator. Additionally or alternatively, this entity may be managed by an external party (e.g., an app store) or a manufacturer (e.g., a manufacturer server).

In a fourth aspect of the disclosure, methods and systems for preparing the UE and the network for cellular traffic generated as a result of the Application Server using the non-cellular capabilities are disclosed.

In order for a device to allow an Application Server to use its non-cellular capabilities and to have some influence on data exchange to and from the device, a number of issues may need to be resolved. For example, there may need to be some incentive to the device and/or the device owner. This may be a monetary incentive or some performance incentive. If a device allows an Application Server to use its non-cellular capability, it may be allotted a higher data cap/limit or a higher uplink/downlink throughput. The incentive may be to provide a public service. Devices may be obligated to allow certain Application Servers to use their non-cellular capabilities in case of natural disasters or public safety.

A second issue that may need to be solved is related to the device's existing subscription to the cellular network. This device subscription may be based on the device's role. Using an industrial robot example, the robot may be equipped with a steerable video camera and infrared camera. However, these are used only by the standalone robot, and images/video captured are not usually transmitted to any remote party/entity. The robot may possess cellular connectivity, but this connectivity may be used only to allow the robot to be tracked (e.g., the robot may report its GPS location once every ten minutes to a cloud based server). As a result, this device may have a very limited subscription, which may only allow access to an IoT network slice and which may only have PDU sessions with very limited uplink and downlink throughputs. An Application Server that wants to use the video recording non-cellular capability of the robot to stream a video feed may need to have these feeds directed to dedicated PDU sessions and to different network slices.

A third issue that may need to be solved deals with how the UE determines who is the "owner" of the cellular traffic to and from the device. Using the industrial robot example, the robot may generate two types of traffic:

GPS traffic to report robot location. This is the traffic that is normally generated by the device according to the intended use of the device (e.g., the device role). This traffic may go on a PDU session that is tied to the subscription of the device (PDU Session 1); and Streaming video traffic. This is the traffic that is generated based on the Application Server using the non-cellular capability of the robot. This traffic may go on a PDU session that is tied to the Application Server (PDU Session 2).

The device may need to know how to route the traffic it generates to the correct PDU sessions so that GPS traffic goes on PDU Session 1 and streaming video traffic goes on PDU Session 2.

To address the second issue, it is proposed that a UE's subscription be enhanced to include Application Server subscription information. The main idea is to have Application Server related information included in the UE's subscription for one or more of the information contained in Table 2.

TABLE 2

| New information to be included in UE Subscription | |
|---|---|
| Application Server Subscribed S-NSSAIs | The additional Network Slices that the UE subscribes to as a result of the Application Server. |
| Application Server Default S-NSSAIs | The Application Server Subscribed S-NSSAIs marked as default S-NSSAI. |
| Application Server Subscribed UE AMBR | The Maximum Aggregated uplink and downlink MBRs to be shared across all Non-GBR QoS Flows created as a result of the Application Server use of the non-cellular capability. |
| Application Server RAT restriction | 3GPP Radio Access Technology(ies) the UE is not allowed to access, for communications with the network resulting from Application Server use of the non-cellular capability. |
| Application Server Forbidden area | Defines areas in which the UE is not permitted to initiate any communication with the network as a result of the Application Server use of the non-cellular capability. |
| Application Server Service Area Restriction | Indicates Allowed areas in which the UE is permitted to initiate communication with the network and Non-allowed areas in which the UE and the network are not allowed to initiate Service Request or SM signaling to obtain user services as a result of the Application Server use of the non-cellular capability. |
| Application Server UE Communication patterns | Information on expected UE communication characteristics resulting from Application Server use of the non-cellular capability. |
| Application Server Subscribed Periodic Registration Timer | Indicates a subscribed Periodic Registration Timer value to be used if UE is in IDLE mode. The network may select the lower of the Subscribed Periodic Registration Timer and the Application Server Subscribed Periodic Registration Timer. |
| For each S-NSSAI in the Application Server Subscribed S-NSSAIs | |
| Application Server Subscribed DNN list | List of the subscribed DNNs for the UE if the SMF selection is a result of Application Server use of the non-cellular capability. |
| Application Server Default DNN | The default DNN if the UE does not provide a DNN for SMF selection as a result of Application Server use of the non-cellular capability. |
| For each DNN in the Application Server Subscribed DNN list | |
| Application Server Allowed PDU Session Types | Indicates the allowed PDU Session Types (e.g., IPv4, IPv6, IPv4v6, Ethernet, and Unstructured) for the DNN, S-NSSAI. |
| Application Server Default PDU Session Type | Indicates the default PDU Session Type for the DNN, S-NSSAI. |
| Application Server Allowed SSC modes | Indicates the allowed SSC modes for the DNN, S-NSSAI. |
| Application Server Default SSC mode | Indicate the default SSC mode for the DNN, S-NSSAI. |
| Application Server 5GS Subscribed QoS profile | The QoS Flow level QoS parameter values for the DNN, S-NSSAI. This includes the subscribed default 5QI (5G QoS Identifier) and subscribed default ARP (Allocation and Retention Priority). |
| Application Server Charging Characteristics | May contain information on how to contact the Charging Function. |
| Application Server Subscribed-Session-AMBR | The maximum aggregated uplink and downlink MBRs to be shared across all Non-GBR QoS Flows in each |

TABLE 2-continued

New information to be included in UE Subscription

PDU Session created as a result of the Application
Server use of the non-cellular capability, which are
established for the DNN, S-NSSAI.

Figure 10:
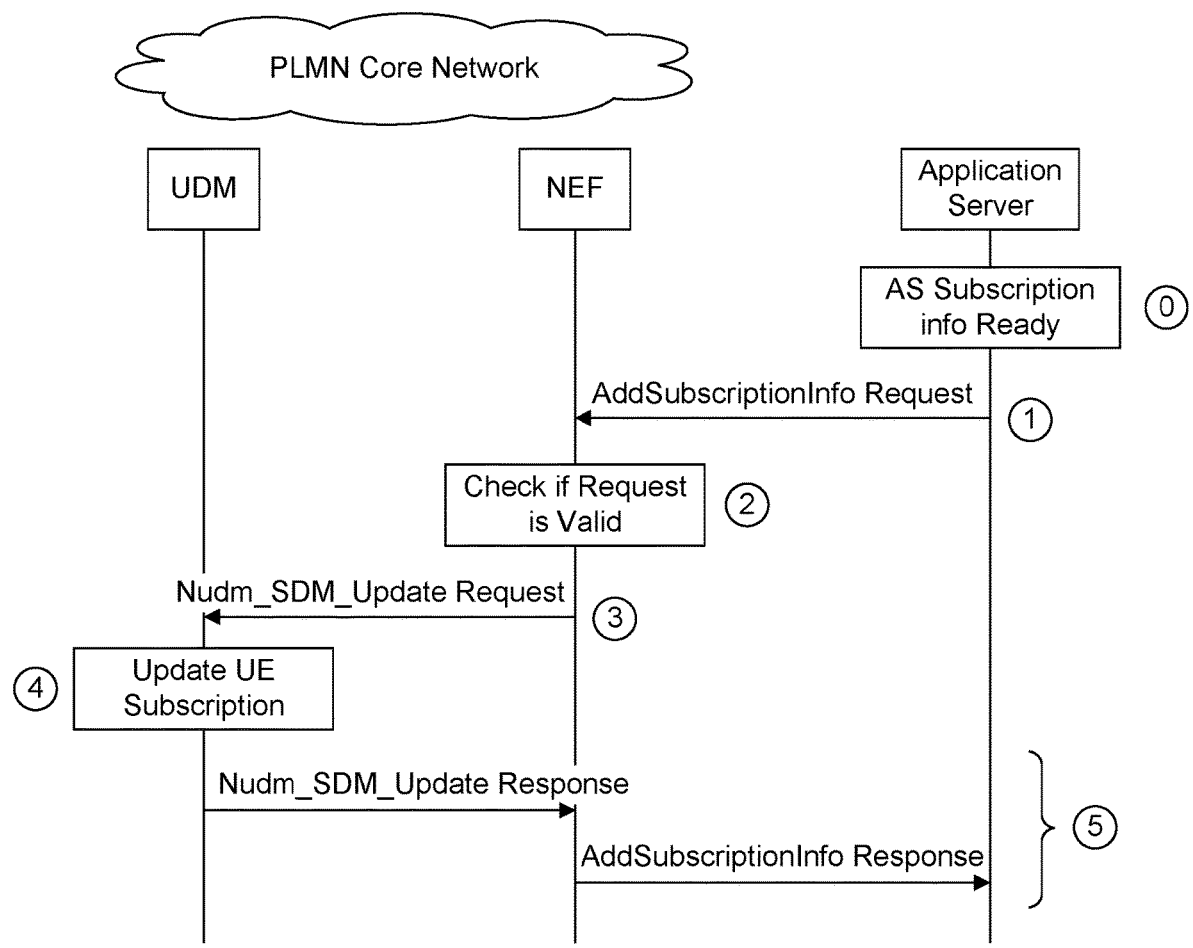
FIG. 10 shows a flow chart of an example method for updating a UE subscription for application server use.

An example method for enhancing a UE's subscription information to include Application Server subscription information is shown in FIG. 10 and discussed below.

At step 0, it is assumed that the Application Server has already discovered the device for which it wants to use the non-cellular capability and is aware of the information to add to the UE's subscription (as shown in Table 2).

At step 1, the Application Server packages the new subscription information into an AddSubscriptionInfo Request message. This message is sent to the NEF of the cellular network and may include but is not limited to one or more of the following:

A Device ID;

An Application Server ID: This may be unique ID identifying the Application Server or the IP address or DNS name of the Application Server;

Priority: Allows the network to prioritize certain requests over others. For example, public safety uses and emergency uses may have the highest priority. Other uses may be tied to the incentive provided to the device. An Application Server providing a larger incentive may want its request prioritized; and New Subscription Information: Information from Table 2.

Additionally or alternatively, the new subscription information may be pre-provisioned in the UEs subscription or may be provided by some Service Capability Server or other management server.

At step 2, the NEF checks that the Application Server is allowed to request use of a device's non-cellular capability. This may be based on the priority. For example, all requests with the highest priority may be accepted. This may additionally or alternatively be based on the Application Server ID. The NEF interacts with the NCMF to check that the UE allows third party control and, if applicable, whether the Application Server ID is on the whitelist of allowed Application Servers.

At step 3, if all checks pass, the NEF forwards the new subscription information to the UDM. This may also include the Device ID. The NEF may use a Nudm_SDM service to forward the information to the UDM, via a Nudm_SDM_Update request/response exchange.

At step 4, the information is added to the UE subscription.

At step 5, response messages are sent to the NEF and Application Server.

To address the third issue, a UE's route selection policy may be updated. The route selection policy may provide to the UE a traffic descriptor (e.g., to help identify the traffic for which the rule applies) and one or more route selection policy rules (which informs the UE regarding PDU session related information about the traffic, such as network slice, DNN, and SSC mode).

In addition to the existing traffic descriptors described in TS 23.503 v15.3.0, the following traffic descriptors may be included:

Application Server ID: An ID of the Application Server which may request non-cellular capability of a device. This may also be the IP address or DNS name of the Application Server. This traffic descriptor may be used to match all traffic generated as a result of a request from the Application Server for some device non-cellular capability; and Non-Cellular Capability: The non-cellular capability which is the source of this traffic. This traffic descriptor may be used to match all traffic generated as a result of a request to use this non-cellular capability of the device.

In addition to the existing UE route selection policy rules described in TS 23.503 v15.3.0, the following UE route selection policy rules may be included:

PDU Session Creation preference: Indicates the preferred time when traffic matching the Traffic Descriptor may trigger the establishment of a PDU session. This may be in terms of windows when PDU sessions may be created or windows when PDU session creation should be avoided. For example, the rule may specify that a UE may only start a PDU session for traffic matching the traffic descriptor (e.g., between 1 AM and 2 AM). Alternatively, the rule may specify creation rules relating to other conditions tied to the UE. Some typical examples of this rule may be to only start a PDU session if the UE is already in in CM CONNECTED mode, to only start a PSU session if remaining battery power >30%, and/or to delete or suspend a PDU session if battery power falls below 15%.

Figure 11:
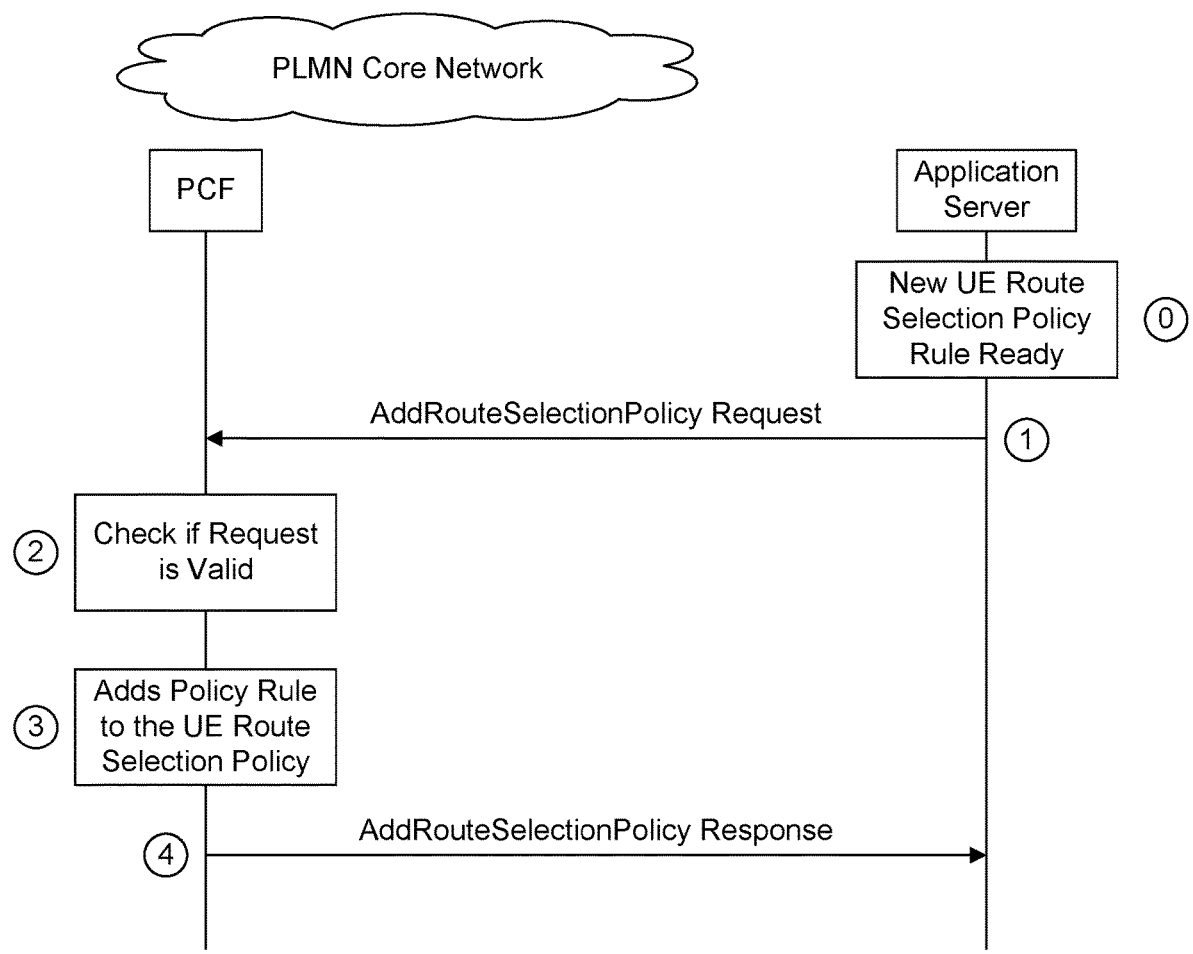
FIG. 11 shows a flow chart of an example method for updating a UE route selection policy.

An example method of how the Application Server provides the route information to the cellular network is shown in FIG. 11 and discussed below. It may be assumed that the Application Server has already discovered the device for which it wants to use the non-cellular capability, and has already updated the UE's subscription to allow the device to use the non-cellular capability. In addition, the Application Server may have already prepared the UE route selection policy rule, including the traffic descriptor and the one or more route selection descriptors.

At step 1, the Application Server packages the UE route selection policy into an AddRouteSelectionPolicy Request message. This message may be an Npcf_PolicyAuthorization_Create Request message. This message is sent to the PCF of the cellular network and may include but is not limited to one or more of the following:

A Device ID;

An application Server ID: This may be a unique ID identifying the Application Server or the IP address of the Application Server; and A Route Selection Policy Rule which may include the new traffic descriptors and UE route selection policy rules.

At step 2, the PCF checks that the Application Server is allowed to modify a UEs Route Selection Policy Rule.

At step 3, if all checks pass, the PCF appends the new policy rule to the UE Route Selection Policy Rule stored in the PCF.

At step 4, a response message is sent to the Application Server.

The Application Server may send the request to the NEF, which then forwards the request to the PCF for further processing. As another alternative, the UE Route Selection Policy may be stored in the UDM along with other policy related information.

After step 4 (although not shown in the figure), the PCF may send the new policy to the UE and the policy may be applied at the UE.

Figure 12:
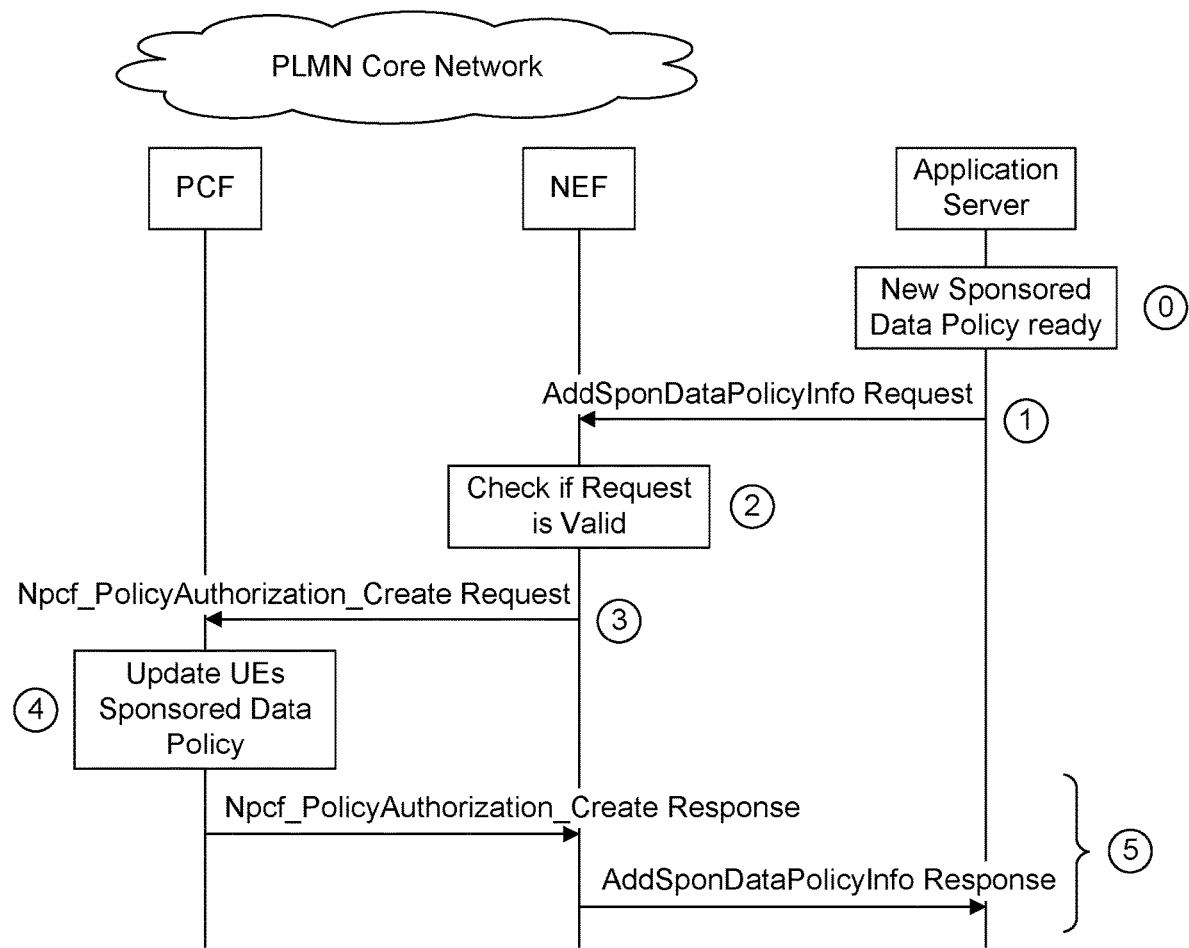
FIG. 12 shows a flow chart of an example method for updating a UE sponsored data policy.

To address the first issue discussed above, the UE's sponsored data policy may be updated. This policy may provide the network with an indication of who to charge for the data that is sponsored by the Application Server. It may provide, for example, the ID of the sponsor, some information to help identify the traffic to the sponsor, and some usage thresholds for the sponsored data. In addition or alternatively to this information (as described in TS 23.503 v15.3.0), the following information may be added to the policy:

Information detailing any incentive for the device hosting the non-cellular capability. This incentive may be an increase in data limit, an increase in uplink/downlink throughputs, access to some non-subscribed cellular service or feature, etc. This information may specify the time periods for which this incentive is valid. An example method for this change in subscription is shown in FIG. 12 and described further below.

At step 0, the Application Server has already prepared the sponsored data policy.

At step 1, the Application Server packages the sponsored data policy into an AddSponDataPolicyInfo Request message. This message is sent to the NEF of the cellular network and includes but is not limited to one or more of the following:

A Device ID;

An Application Server ID: This may be unique ID identifying the Application Server or the IP address of the Application Server; and A Sponsored Data Policy (including new incentive information).

At step 2, the NEF checks that the Application Server is allowed to update a UEs sponsored data policy and request use of a device's non-cellular capability.

At step 3, if all checks pass, the NEF forwards the new subscription information to the PCF. This may be accomplished using a Npcf_PolicyAuthorization_Create Request/Response message exchange.

At step 4, the information is added to the UE policy information.

At step 5, response messages are sent to the NEF and Application Server.

Additionally or alternatively, the Application Server may send the request directly to the PCF. The UE Sponsored Data Policy may be stored in the UDM along with other policy related information.

Figure 13:
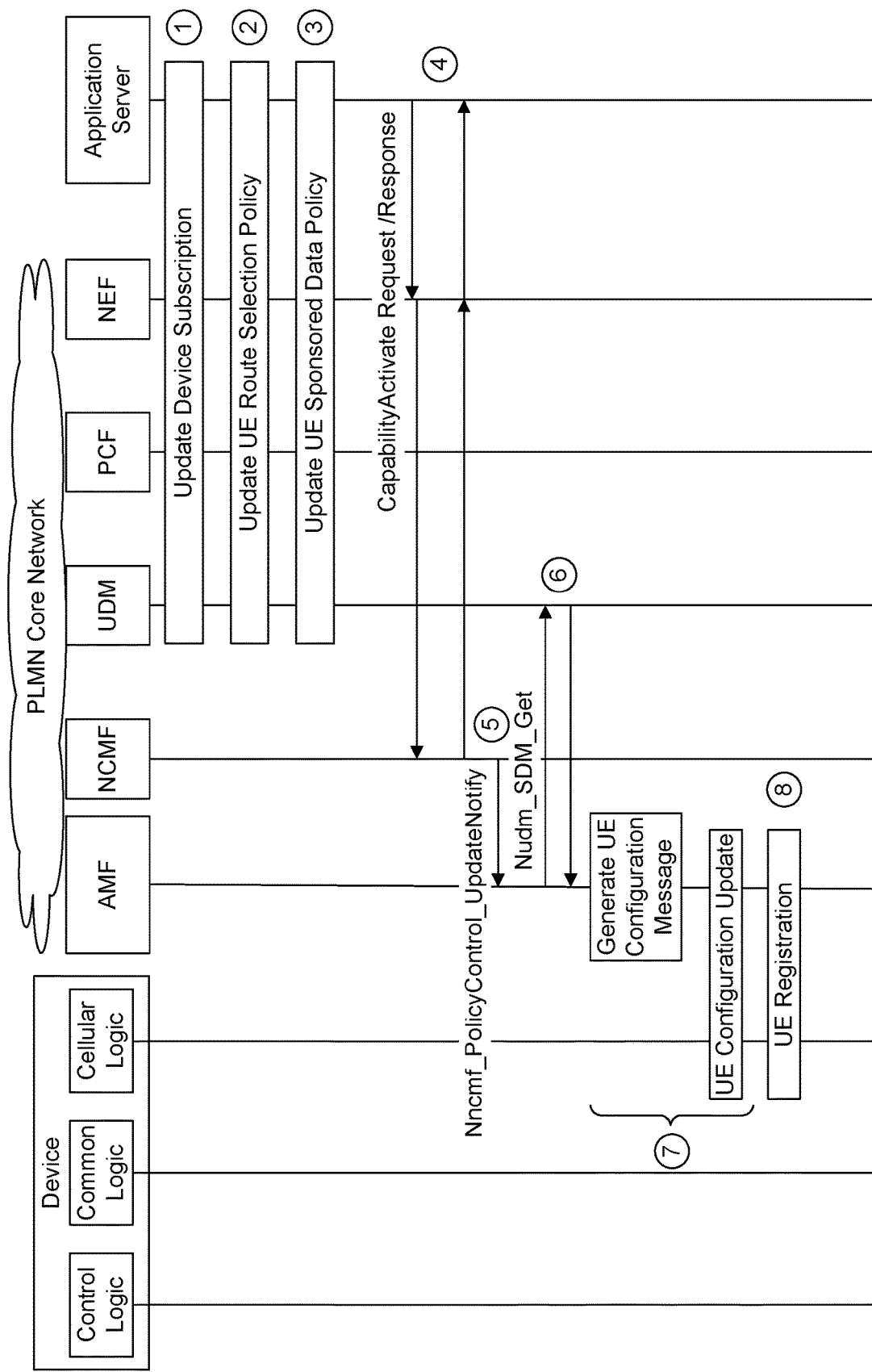
FIG. 13 shows a flow chart of an example method for setting up a PDU session over a cellular network.
Figure 13:
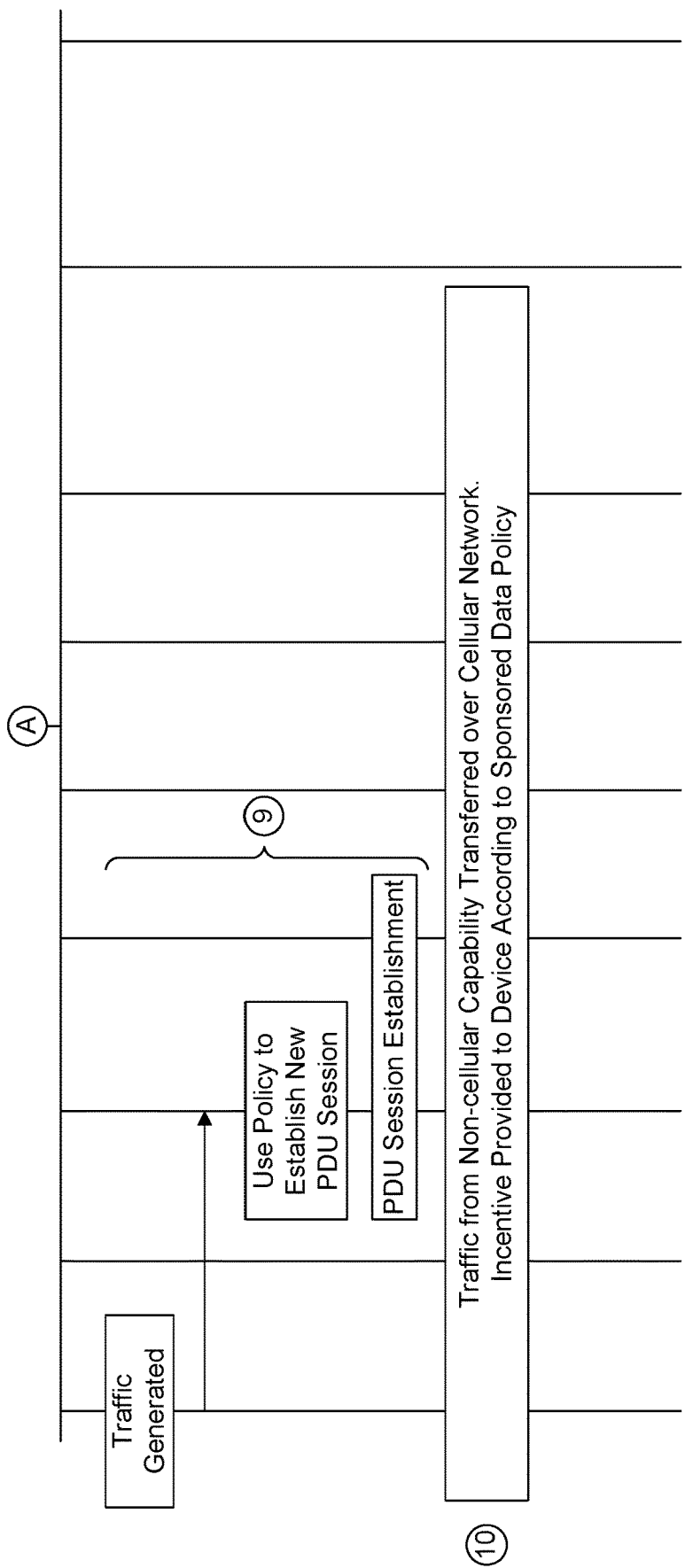

An example method to setup the subscription and policies is shown in FIG. 13 and discussed below. It may be assumed that the Application Server has already discovered the non-cellular capabilities it wants to use and has already configured the non-cellular capability.

At step 1, the Application Server updates the device subscription to include the subscription information related to the traffic that will be generated as a result of the Application Server use of the non-cellular capability of the device.

At step 2, the Application Server updates the UE Route Selection Policy for the UE traffic that will be generated as a result of the Application Server use of the non-cellular capability of the device.

At step 3, the Application Server updates the UE Sponsored Data Policy to provide the incentive for the UE to allow the Application Server to use the non-cellular capability of the device.

At step 4, after updating the device subscription and UE policies stored in the network, the Application Server may provide a start indication or schedule to the NCMF to indicate when the Application Server would like to use the non-cellular capability. The Application Server may issue a CapabilityActivate request message to the NEF. This message may include but is not limited to one or more of the following:

A request for permission to access a non-cellular capability of one or more devices for which it currently does not have access to; and A time window, schedule, priority or QoS requirement associated with its access to a non-cellular capability of a one or more devices.

The NEF may forward this message to the NCMF, which verifies that the Application Server is allowed access to the non-cellular capability.

At step 5, at the appropriate time (e.g., based on the start indication or the schedule), the NCMF triggers the core network to push the new UE policies and the new Configured NSSAI. The NCMF may notify the AMF about a change in UE policy and/or new Configured NSSAI. This may be through a subscription to the NCMF and use of the Nncmf_PolicyControl_UpdateNotify message, or through some new service provided by the AMF to handle policy change messages from the NCMF.

At step 6, the AMF retrieves the Application Server subscription information from the UDM (for example using Nudm_SDM_Get service). The AMF may use this information to create a new Configured NSSAI list. This list may contain the subscribed S-NSSAIs related to the Application Server.

At step 7, the AMF generates a UE Configuration Update message to the UE to provide the new UE Route Selection Policy as well as the new Configured NSSAI. It may also request that the UE re-register. This message may also contain schedule information on when the Application Server intends to use non-cellular capability and in turn when the device should update its slice info and UE traffic routing policies.

At step 8, the UE re-registers and is provided with an update to its Allowed NSSAI.

At step 9, if traffic is generated by the non-cellular capability, the UE uses the UE route Selection Policy to request a new PDU session.

At step 10, traffic from the non-cellular capability is transferred over the cellular network. The incentive may be provided to the device according to sponsored data policy.

Note that in Step 5, the method shows the NCMF notifying the AMF about a need to update the UE policies and/or new Configured NSSAI. As an alternative, once the Application Server has completed steps 1-3, the PCF can notify the AMF. This may be through a subscription to the PCF and/or a use of the Npcf_AMPolicyControl_UpdateNotify message, or alternatively through some new service provided by the AMF to handle policy change messages from the PCF.

Note that the method of FIG. 13 shows that the UE is provided the configuration through a NAS control message (UE Configuration Update). Additionally or alternatively, it may also be provided through an SMS message originating from the NCMF, PCF, or AMF. The SMS may be targeted to a well-known or reserved application or port ID. There may be an application listening on the well-known port ID that may receive the request.

Figure 14:
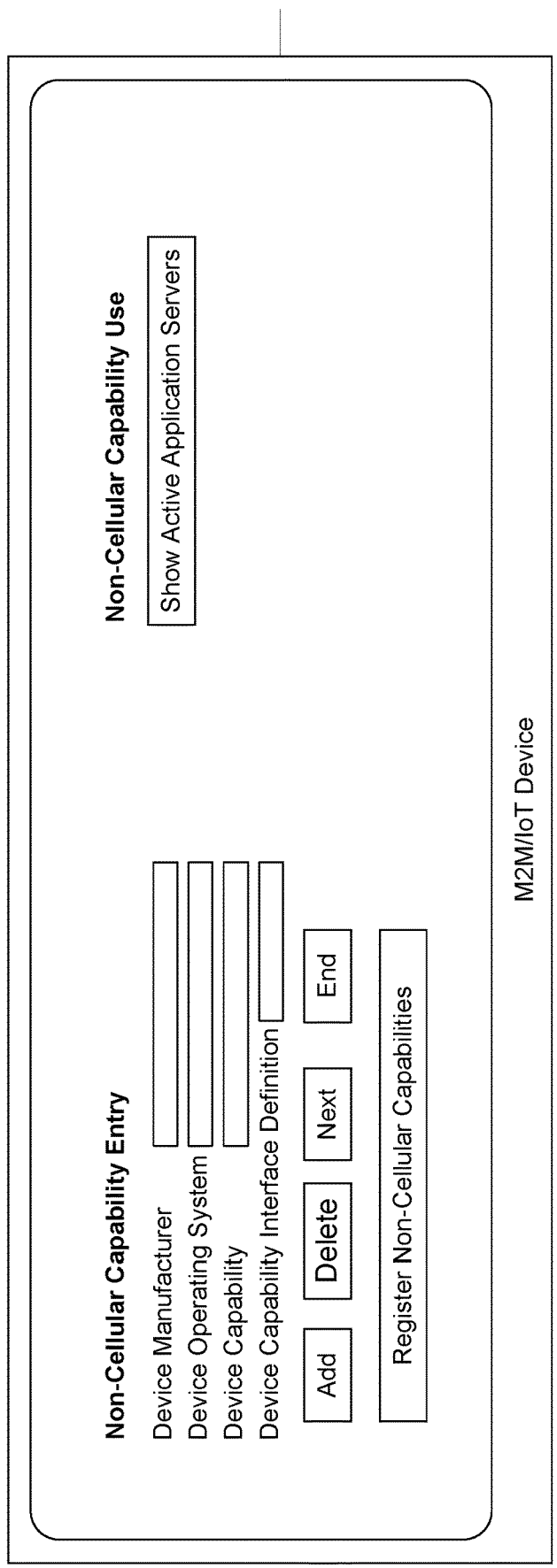
FIG. 14 shows an example user interface at an M2M/IoT device.

A Graphical User Interface may be used at the M2M/IoT devices, for example, to enter the non-cellular capabilities of the device, request the UE to register its non-cellular capabilities with the core network, and/or to view the current Application Servers that are using its non-cellular capabilities. An example GUI at the M2M/IoT Device is shown in FIG. 14.

Figure 15:
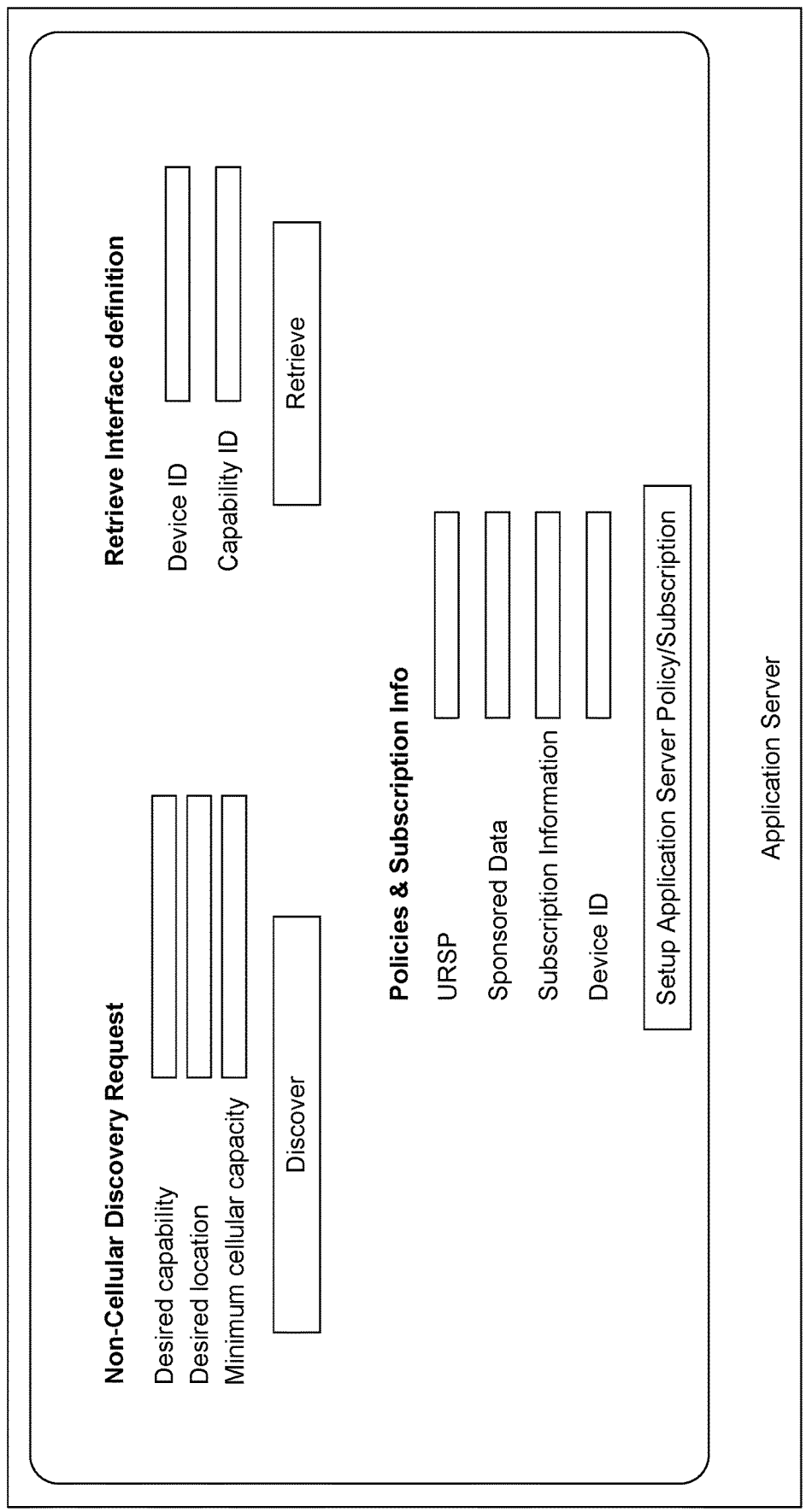
FIG. 15 shows an example user interface at the application server.

A Graphical User Interface may be used at the Application Server, for example, to enter and launch a non-cellular discovery request (including the desired non-cellular capabilities, device location, and minimum cellular capabilities), view the information for the discovered non-cellular capabilities, retrieve the interface definition of a device, configure the non-cellular capability of a device, and/or to configure the policies (e.g., URSP and sponsored data). An example GUI at the Application Server is shown in FIG. 15.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below:

| Acronym | Term |
| --- | --- |
| 5GC | 5G Core |
| 5GS | 5G System |
| AE | Application Entity |
| AF | Application Function |
| 5G-GUTI | 5G Globally Unique Temporary Identifier |
| 5G-TMSI | 5G Temporary Mobile Subscriber Identity |
| AS | Application Server |
| AMF | Access and Mobility Management Function |
| CN | Core Network |
| DM | Device Management |
| DN | Data Network |
| DNN | Data Network Name |
| DRX | Discontinuous Reception |
| EPC | Evolved Packet Core |
| EPS | Evolved Packet System |
| GPSI | Generic Public Subscription Identifier |
| GUID | Globally Unique Identifier |
| GUTI | Globally Unique Temporary UE Identity |
| HPLMN | Home PLMN |
| IE | Information Element |
| IMEI | International Mobile Equipment Identity |
| IMSI | International Mobile Subscriber Identity |
| IP | Internet Protocol |
| IoT | Internet of Things |
| LTE | Long Term Evolution |
| M2M | Machine to Machine |
| MME | Mobility Management Entity |
| MSISDN | Mobile Station Integrated Services Digital Network |
| NAS | Non-Access Stratum |
| NCMF | Non-Cellular Capability Management Function |
| NEF | Network Exposure Function |
| NSSAI | Network Slice Selection Assistance Information |
| NSSP | Network Slice Selection Policy |
| OMA | Open Mobile Alliance |
| OTA | Over-the-Air |
| PDU | Packet Data Unit |
| PEI | Permanent Equipment Identifier |
| PLMN | Public Land Mobile Network |
| RAN | Radio Access Network |
| SCS | Service Capability Server |
| SMS | Short Message Service |
| SSC | Session and Service Continuity |
| SSCMP | SSC Mode Selection Policy |
| SSF | Sociability Service Function |
| SUPI | Subscription Permanent Identifier |
| TMSI | Temporary Mobile Subscriber Identity |
| UDM | Unified Data Management |
| UDR | Unified Data Repository |
| UE | User Equipment |
| UDSF | Unstructured Data Storage Function |
| URSP | UE Route Selection Policy |

The following is a list of terms and definitions relating to service layer technologies that may appear in the above description. Unless otherwise specified, the terms and definitions used herein refer to the corresponding term listed below:

Cellular Capability: The cellular capabilities as defined by 3GPP. A device may have radio capabilities as well as CN capabilities.

Control Logic: Logic that controls a specific non-cellular capability of a device. For simple non-cellular capabilities, the control logic may be a hardware driver, whereas for more complex non-cellular capabilities, the control logic may be an application running on the device.

Cellular Logic: The logic responsible for managing the control plane protocols of the cellular system. For example, the cellular logic may handle the NAS and AS protocols of the 5G system.

Common Logic: The logic responsible for communicating with each of the control logics through an interface. Examples of the common logic include an application running on the device, the operating system running on the device, or a device management client running on the device (such as an OMA DM client). The common logic may have an interface to the control logic of each non-cellular capability. This interface is used to provide the necessary parameters to control the non-cellular capability. In addition, the common logic may also communicate with the cellular logic to retrieve or send user plane or control plane messages sent over the cellular network.

Device Role: This is the main purpose of the device, or the reason why the device is deployed. It describes how the device is used or applied.

Device capability: This is a list of one or more "supported features/capabilities" that the device has. For example, a smartphone may have the following device capabilities: cellular communication, WiFi communication, camera, GPS, accelerometer gyroscope, compass, etc. It may be thought of as the supported features of the device. A device may have cellular capabilities (as defined by 3GPP in the UE radio capabilities and the UE network capabilities), as well as non-cellular capabilities (for example video camera).

M2M/IoT Application: Application that resides on a device and that uses a cellular network for connectivity services and/or an M2M/IoT server for specialized M2M services such as access control and data storage.

M2M/IoT Server: Infrastructure node that offers M2M services to M2M/IoT devices. These services reduce the burden on M2M/IoT applications and devices, and include services such as discovery and access control. A oneM2M IN-CSE is an example of a M2M/IoT Server that follows the oneM2M standard. 3GPP refers to such an entity as a Service Capability Server (SCS) or an Application Function (AF) or an Application Server (AS).

Non-Cellular Capability: A capability of a device that is not related to cellular communication. The term is intended to be very broad, so for example a smartphone may have cellular capabilities (to use LTE), WiFi capabilities, camera capabilities, compass capabilities, GPS capabilities, etc. The non-cellular capabilities are everything other than the LTE cellular capabilities. So the smartphone above would have the following non-cellular capabilities: WiFi, camera, compass, GPS, etc. The non-cellular capabilities may or may not generate traffic that needs to be transmitted over the cellular network using the cellular capabilities.

Non-Cellular Capability Interface: The interface used to configure the non-cellular capability. The interface may have an interface definition.

SMS Handler: The logic in a device that handles the contents of an SMS message and determines what to do with this message.

What is claimed is:

1. A wireless transmit/receive unit (WTRU) comprising a processor and a memory, the memory storing computer-executable instructions which, when executed by the processor, cause the WTRU to:
send, via an access and mobility management function (AMF), to a network node in a core network via a Non-Access Stratum (NAS) message, a non-cellular capability registration request, the non-cellular capability registration request comprising an identifier of the WTRU, an indication of one or more non-cellular device capabilities to be registered with the network to facilitate a discovery operation, and, for each of the one or more non-cellular device capabilities, a non-cellular capability identifier; and
receive, from the network node, an acknowledgement for the non-cellular capability registration request.

2. The WTRU of claim 1, further comprising an application, a service, or a capability, wherein the instructions further cause the non-cellular capability registration request to be triggered by one or more of the application, the service, or the capability.

3. The WTRU of claim 1, wherein the instructions further cause the non-cellular capability registration request to be triggered by one or more of the WTRU powering on, the WTRU rebooting, an initial registration request being sent from the WTRU, or periodically.

4. The WTRU of claim 1, wherein the non-cellular capability registration request further comprises an address or Uniform Resource Locator (URL) used to obtain more information about the one or more of the non-cellular device capabilities.

5. The WTRU of claim 1, wherein the non-cellular capability registration request further comprises a device manufacturer identifier or an indication of an operating system of the WTRU.

6. The WTRU of claim 1, wherein the non-cellular capability registration request further comprises information regarding a power source of the WTRU.

7. The WTRU of claim 1, wherein the non-cellular capability registration request further comprises access permission information for an entity, the access permission information pertaining to one or more of the non-cellular device capabilities.

8. The WTRU of claim 1, wherein the non-cellular capability registration request further comprises information regarding one or more types of operations that an entity may perform using one or more of the non-cellular device capabilities.

9. The WTRU of claim 1, wherein the non-cellular capability registration request further comprises information used to identify locations where an entity may access one or more capabilities.

10. The WTRU of claim 1, wherein the non-cellular capability registration request is triggered by Application Programming Interface (API) or an Attention (AT) command.

11. The WTRU of claim 1, wherein the instructions further cause the WTRU to receive, from an Application Server (AS), a control message comprising information from the non-cellular capability registration request.

12. A method performed by a wireless transmit/receive unit (WTRU), the method comprising:
sending, via an access and mobility management function (AMF), to a network node in a core network via a Non-Access Stratum (NAS) message, a non-cellular capability registration request, the non-cellular capability registration request comprising an identifier of the WTRU, an indication of one or more non-cellular device capabilities to be registered with the network to facilitate a discovery operation, and, for each of the one or more non-cellular device capabilities, a non-cellular capability identifier; and
receiving, from the network node, an acknowledgement for the non-cellular capability registration request.

13. The method of claim 12, wherein sending the non-cellular capability registration request further comprises sending the non-cellular capability registration request based on one or more of the application, the service, or the capability.

14. The method of claim 12, wherein sending the non-cellular capability registration request further comprises sending the non-cellular capability registration request based on one or more of the WTRU powering on, the WTRU rebooting, an initial registration request being sent from the WTRU, or periodically.

15. The method of claim 12, wherein the non-cellular capability registration request further comprises an address or Uniform Resource Locator (URL) used to obtain more information about the one or more of the non-cellular device capabilities.

16. The method of claim 12, wherein the non-cellular capability registration request further comprises a device manufacturer identifier or an indication of an operating system of the WTRU.

17. The method of claim 12, wherein the non-cellular capability registration request further comprises information regarding a power source of the WTRU.

18. The method of claim 12, wherein the non-cellular capability registration request further comprises access permission information for an entity, the access permission information pertaining to one or more of the non-cellular device capabilities.

19. The method of claim 12, wherein the non-cellular capability registration request further comprises information regarding one or more types of operations that an entity may perform using one or more of the non-cellular device capabilities.

20. The method of claim 12, wherein the non-cellular capability registration request further comprises information used to identify locations where an entity may access one or more capabilities.

* * * * *